Nov. 22, 1966          R. W. BAINS          3,287,704
                        CODE INTERPRETER
Filed Feb. 28, 1963                    8 Sheets-Sheet 1

INVENTOR
Robert W. Bains
BY Adolph C. Hugin
ATTORNEY

INVENTOR
Robert W. Bains

Nov. 22, 1966  R. W. BAINS  3,287,704
CODE INTERPRETER
Filed Feb. 28, 1963  8 Sheets-Sheet 5

INVENTOR
Robert W. Bains

BY Adolph C. Hugin
ATTORNEY

INVENTOR
Robert W. Bains

BY Adolph C. Hugin

ATTORNEY

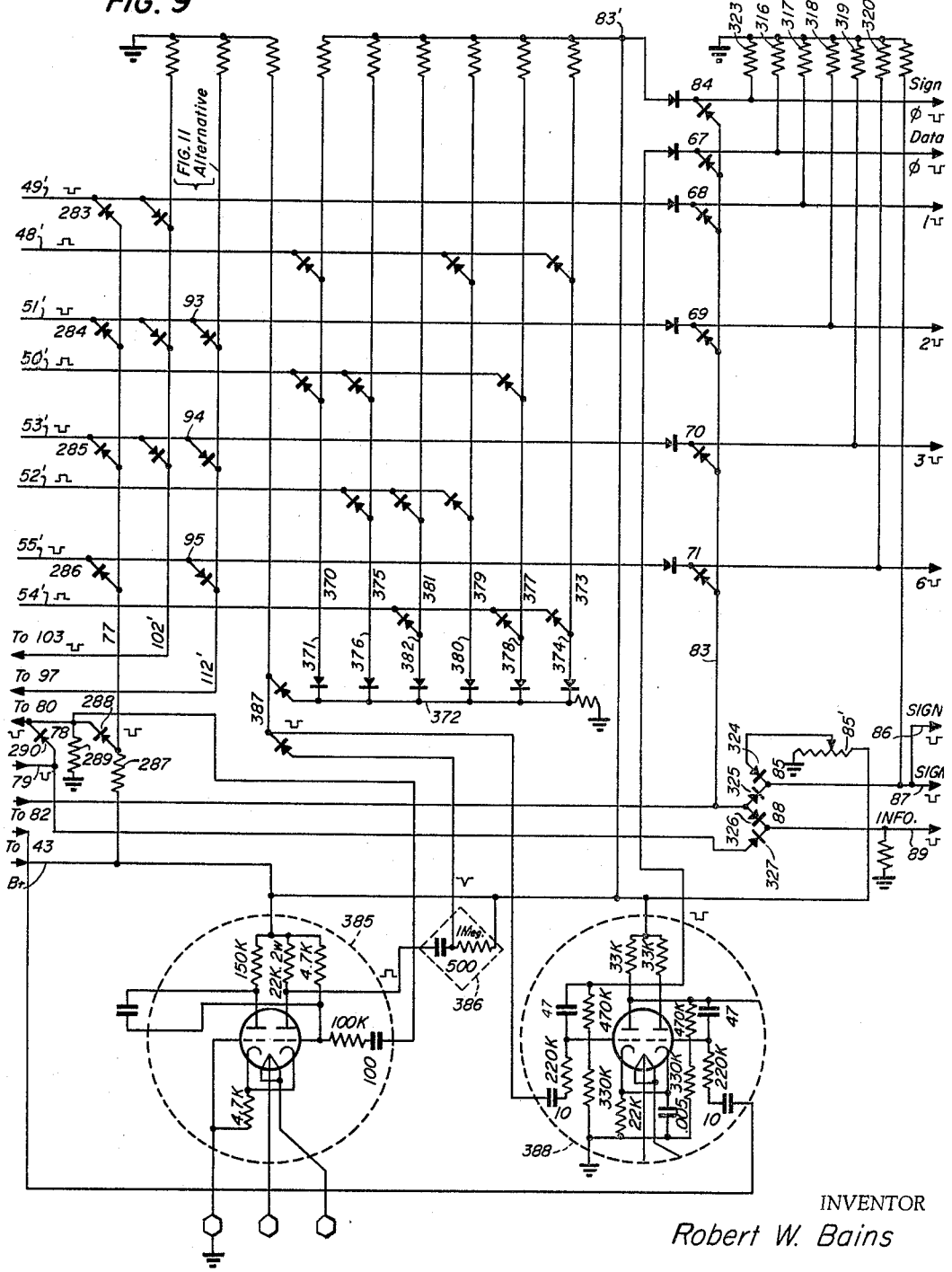

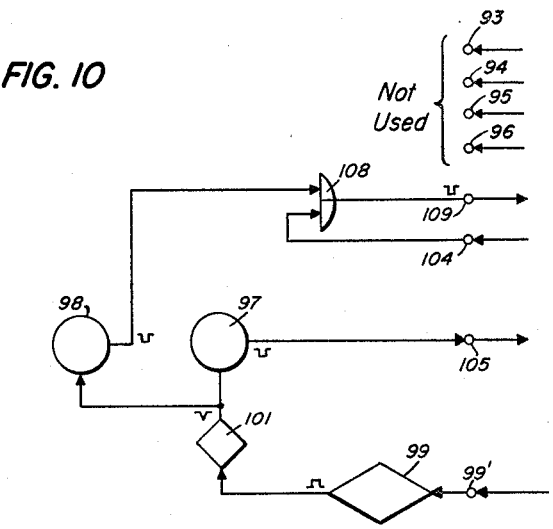
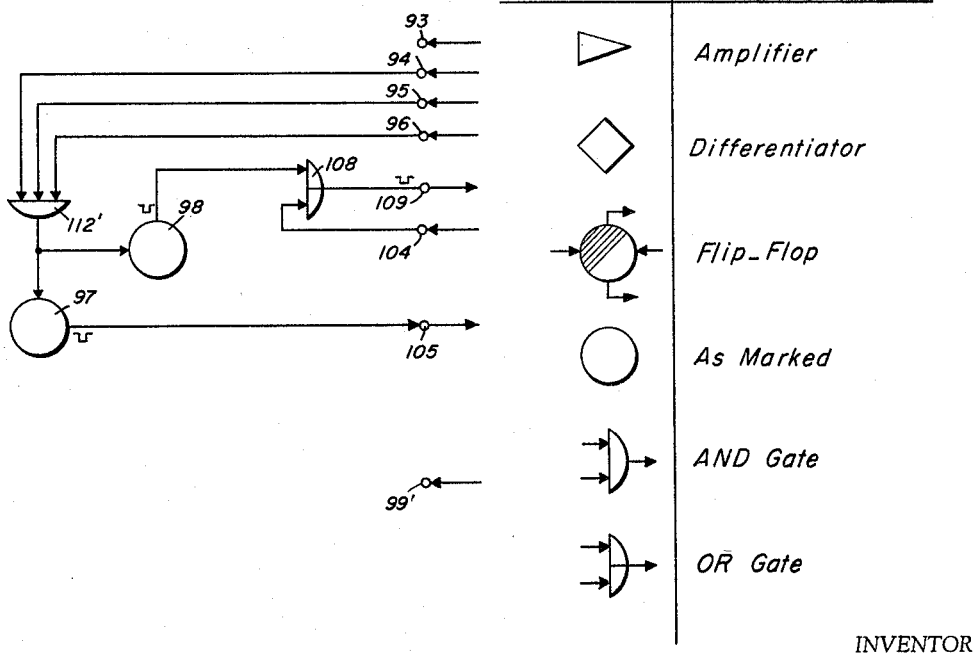

３,287,704
CODE INTERPRETER
Robert W. Bains, Shreveport, La., assignor to United Gas
Corporation, a corporation of Delaware
Filed Feb. 28, 1963, Ser. No. 261,905
14 Claims. (Cl. 340—172.5)

This invention relates to electronic data processing apparatus and more particularly to a record or data interpreter for sensing information recorded in one code, such as a four-channel binary coded decimal code, converting it into another code, such as a two-out-of-five code, and producing certain instruction or control signals in response to requests from a data receiving and processing equipment component.

In the collection and handling of masses of data, it is often convenient and desirable to be able to record and store the data by means of easily handled portable magnetic digital recorders which are simple to operate and which record at relatively low speeds. The records usually are made on small magnetic tape which gives a compact storage medium. The utilization of the data thus collected often requires that it be interpreted before it can be supplied to a processing computer. Transferring such encoded data from a magnetic tape often necessitates a translation from the code utilized on the tape to a code suitable for use by the computer and synchronized to the usual high speed operation of the electronic computer to which the interpreted output is supplied.

In its most specific aspect, the invention contemplates an electronic record interpretation apparatus adapted to sense, as by a magnetic read head, magnetic tape records inscribed in a given code, such as a modified binary code of the 1, 2, 4, 8 or 1, 2, 3, 6 type, and converting it into another code, such as the $\phi$, 1, 2, 3, 6 two-out-of-five code, acceptable to a data receiving and processing equipment component, and producing certain additional information and instruction signals for the processing equipment component in response to a request therefrom.

This invention may be briefly described as an intepreter comprising a multiple-channel sensing member, such as a four-channel magnetic read head and tape transport, for sensing multiple-channel coded data, such as data in 1, 2, 4, 8 or 1, 2, 3, 6 binary coded decimal code on magnetic tape, and, on receipt of a request, such as an OPERATION READ signal, from a data receiving and processing component of a computer system, providing data signals representing data in each channel of the stored record. These data signals may be amplified and shaped, as by suitable amplifiers and Schmitt triggers, and supplied to control gates which are connected to pass information on receipt of the request from the data receiving and processing component of the computer system. Data signals passed by the control gates are placed in binary form by suitable binaries and these binary outputs are interpreted by suitably interconnected gates which convert the binary data signals into two-out-of-five coded data signals which are also gated and related to the request signal so as to provide instruction or control signals, such as signals of SIGN, INFORMATION, END-OF-CARD, and END-OF-FILE. The latter two signals may be generated as special data signals from recorded information sensed by the read head from the tape or other memory medium. Resetting of the binaries following each reading of a word normally is done in response to a reset signal inherently produced within the interpreter and may also be performed by a manually applied signal or by a reset signal from the receiving component.

Magnetic tape is adapted to be moved by a tape transport driven by a suitable motor which passes the tape at the proper speed across the read head and which cooperates with a suitable brake for starting, running, and stopping the tape transport under control of the interpreter system and also carries out all other necessary spooling and reeling operations. Provision is made for continuously reading magnetic tape for a complete file, and the transport driving motor is adapted to be energized by either of two controls, one of which closes the motor circuit by the OPERATION READ signal, and the other of which closes the motor circuit in response to a signal which holds the circuit closed between the reading of words. Thus, the transport motor is not stopped between words, but is stopped and started only between the end of a file and the start of another file. This generally will result in a starting and stopping of the tape transport motor only at the end of a complete tape record.

An END-OF-CARD signal is generated at the end of each word read by the read head and is supplied to the processing component of the computer as this type of signal is required by the computer component for which the present intepreter is designed. This provides a period between the END-OF-CARD signal and the OPERATION READ signal which enables the processing component of the computer to make the desired computations with the information comprising the last word, that is, with the information between END-OF-CARD signals, and then to request additional information from the interpreter without the necessity of stopping the reading process by the interpreter.

An object of the present invention is to provide an interpreter which can sense information recorded in one code and to interpret it into another code and produce certain instruction or control signals, all in response to a request from a data processing equipment component.

Another object of the present invention is to provide an improved interpreter for sensing information coded in a four-channel binary coded decimal code, converting it into a two-out-of-five code, and providing certain instruction and control signals in response to a request signal from a data processing equipment component.

A further object of the present invention is to provide an electronic device for sensing 1, 2, 4, 8 binary coded decimal data, converting it into $\phi$, 1, 2, 3, 6 two-out-of-five code, and producing certain instruction or control signals, all in response to a request from a data processing equipment component.

Yet another object of the present invention is to provide an improved interpreter for sensing 1, 2, 3, 6 binary coded decimal data, converting it into $\phi$, 1, 2, 3, 6 two-out-of-five coded data, and producing certain instruction and control signals, all in response to requests from a data processing equipment component.

A yet further object of the present invention is to provide an improved matrix for converting a four-channel binary coded decimal code into a two-out-of-five code.

Further object and advantages of this invention will become apparent from the following description referring to the accompanying drawings, and the features of novelty which characterize this invention will be pointed out with particularity in the claims appended to and forming a part of this specification.

In the drawings:

FIG. 9 is a schematic circuit diagram illustrating the major gating circuitry for converting 1, 2, 3, 6 binary coded decimal code into $\phi$, 1, 2, 3, 6 two-out-of-five code and providing END-OF-CARD and END-OF-FILE instruction or control signals in a system such as that shown in FIG. 8;

FIGS. 10 and 11 are alternative logic diagrams illustrating arrangements for providing END-OF-CARD and END-OF-FILE instruction signals in the system shown in FIG. 8; and FIG. 12 defines the symbology used in connection with the logic diagrams in this application.

Figure 1:
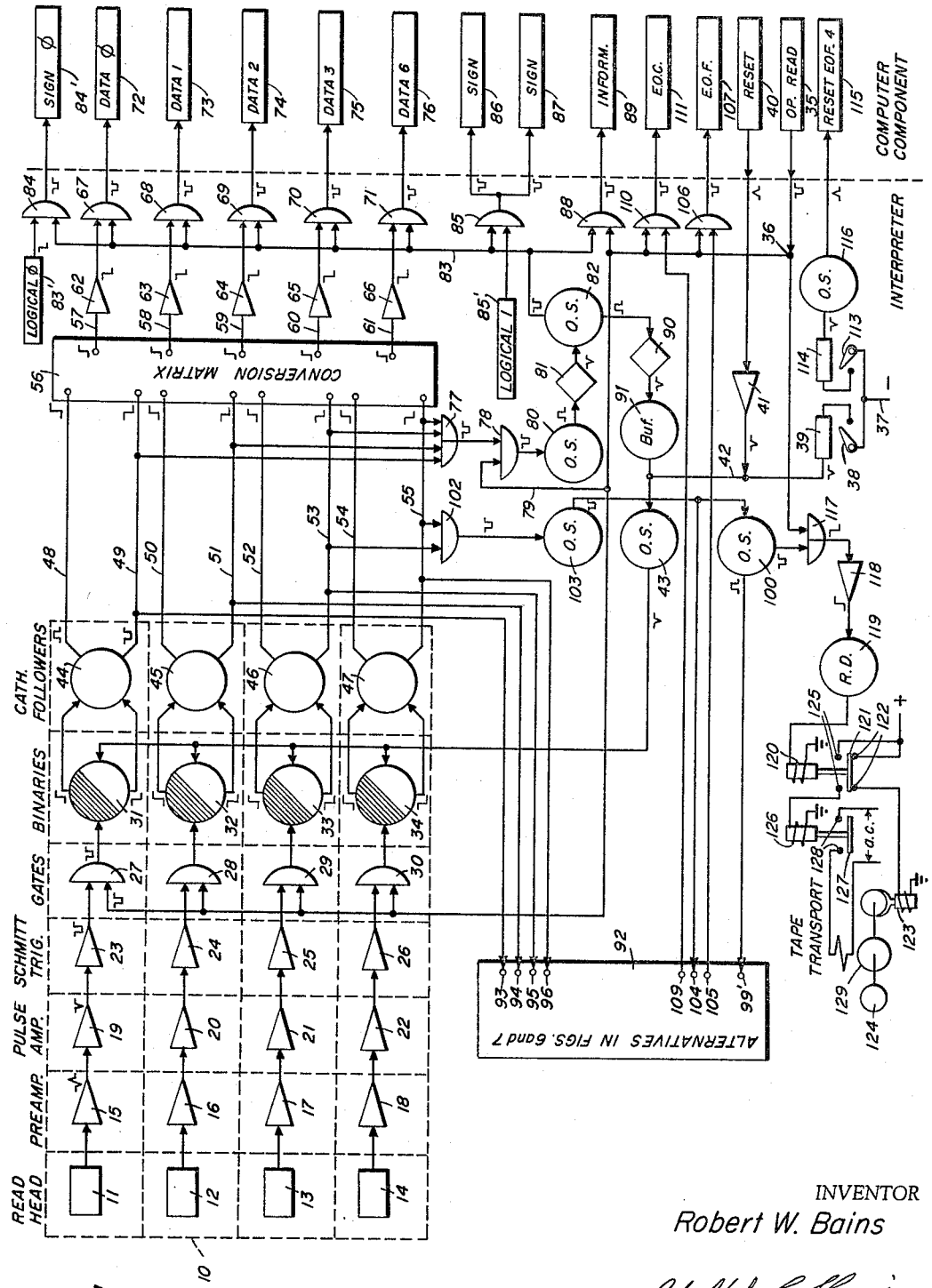
FIG. 1 is a schematic logic diagram illustrating an electronic interpreter embodying the present invention.

*Logics and general system for a 1, 2, 4, 8 binary coded decimal code to 1, 2, 3, 6 two-out-of-five interpreter*

Referring to the drawings, an embodiment of the present invention is illustrated in FIGS. 1 through 7 which is particularly useful as an electronic code interpreter for reading relatively small tape, such as quarter-inch magnetic tape, on which data may have been recorded by a suitable magnetic digital recorder. The interpreter illustrated in these figures is adapted to read a four-level or four-channel code, make conversions into a desired two-out-of-five code to supply data signals to a computer receiving and processing equipment component, and to supply SIGN, INFORMATION, END-OF-CODE, and END-OF-FILE instruction or control signals, as required by the signal receiving component.

The coded data information may be of any suitable modified binary coded decimal code of which the 1, 2, 4, 8 and 1, 2, 3, 6 codes are well known examples. The interpreter illustrated in FIG. 1 is specifically directed to read a four-channel 1, 2, 4, 8 binary coded decimal code. The circuits for implementing the logics of the interpreter shown in FIG. 1 may utilize conventional vacuum tubes or solid state electronics for providing, in the proper time relationship, the desired output signals suitable for input to the terminals of a computer receiving and processing component. Generally, the latter component will have fixed input requirements regarding, not only the type of code which it will accept, but also the type of instruction or control signals which are to be supplied as inputs to the component and the type of control signals which the component is constructed to supply for controlling the apparatus which provides the input to the component.

In the illustrated equipment, the processing component which is the receptor of the output signals of the interpreter requires $\phi$, 1, 2, 3, 6 two-out-of-five code data signals, three SIGN signals, an INFORMATION signal, END-OF-CARD and END-OF-FILE signals, and a RESET END-OF-FILE-4 signal. This computer processing receptor component is adapted to supply two control signals to the interpreter. One of these signals, the OPERATION SERIAL READ signal, is a control signal which is utilized to request information from the interpreter when the receptor component is in condition to receive and process information. The second control signal from the receptor component is a RESET signal which is adapted automatically to reset the interpreter circuitry. In the illustrated embodiment, the END-OF-WORD signal corresponds to the END-OF-CARD signal supplied to the receptor component.

In an interpreter such as that shown in the drawings, the necessary equipment for moving quarter-inch magnetic tape across a four-track read head at the proper speed and to start and stop the tape movement under the control of the interpreter, while carrying out all other necessary spooling and reeling operations, may comprise any suitable tape transport, such as that shown in Patent 2,828,961 Rehklau, preferably also provided with a suitable brake for holding the tape driving capstan when the motor is not in operation. The illustrated interpreter may be considered as a code intelligence or information translation and transformation component of a complete data processing system with which such an interpreter is associated because it has the property of being able to sense coded information from a suitable storage or memory medium, such as a magnetic tape, to convert and transform such coded data into another code, and to provide instructions for use with a receptor component of the data computing system. The interpreter and the components of the interpreter incorporating the present invention are particularly adapted for use as a member of a larger data processing system or machine, but these have distinct and separate utility, both as individual units and in combination with other data processing apparatus.

In the FIG. 1 system, any suitable four-channel read head 10 may be utilized for reading a four-track or four-channel magnetic tape encoded with 1, 2, 4, 8 binary coded decimal data. The read channels comprise conventional read head units 11, 12, 13, and 14, which are adapted respectively to read the 1's, 2's, 4's, and 8's in the four tracks or channels of the magnetic tape. Each read channel of the read head 10 is substantially identical and is connected to substantially identical circuitry for carrying out the logics of each channel in reading encoded data from the magnetic tape and transforming it into usable binary coded signals corresponding to the data read by the read head. These signals and subsequent signals and pulses are shown generally in the drawings adjacent to the sources of the signals and indicates the output or resultant pulse or signal after the occurrence of a specified operation by the unit adjacent to which the symbol is applied.

In reading conventional magnetic tape at a speed of about thirty inches a second, which is the speed selected for the tape transport to move film across the reading head, several millivolts will be generated in the respective read head units, and this is not sufficient to provide the desired triggering of a conventional binary to produce the necessary output signals for operating the remainder of the interpreter. The output signals of the read head units 11–14, therefore, are transmitted respectively to suitable preamplifiers 15, 16, 17, and 18 of any conventional type, preferably of the two-stage direct coupled transistor type, the outputs of which are amplified replicas of the inputs from the read head units. The outputs of these preamplifiers preferably are further amplified by suitable conventional pulse amplifiers 19, 20, 21, and 22, and the outputs of these pulse amplifiers are respectively shaped by Schmitt triggers 23, 24, 25, and 26 to provide negative trigger signals in each of the four channels. These signals are adapted respectively to be passed through AND gates 27, 28, 29, and 30, so as to trigger suitable conventional binaries 31, 32, 33 and 34.

The transmittal of the triggering signals through the AND gates 27–30 is adapted to be controlled by the receptor component of the data processing system which provides an OPERATION READ signal to one of its output control terminals 35 connected to an input terminal 36 of the interpreter. This OPERATION READ signal is a request by the receptor to the interpreter to supply information to the receptor for processing by it. The OPERATION READ signal is transmitted through the interpreter and is impressed upon each of the AND gates 27–30 as the second input to each of these two-input gates such that, when the OPERATION READ signal is transmitted to the gates from the receptor terminal 35, these AND gates pass triggering signals respectively to the binaries 31-34 as required by the presence of data signals on the other inputs of these gates.

The binaries are adapted to be reset by a suitable resetting pulse which may be applied to the binaries from a suitable voltage source 37 by a manually operable switch 38 which energizes a suitable pulse generator 39 of any conventional type, such as that disclosed in "Digital Modules", Digital Equipment Corporation, Maynard, Massachusetts, copyrighted 1962, page 211, for supplying a resetting pulse to the system. The receptor component of the computer system provides a RESET signal to its output terminal 40, which is adapted to be impressed on all reset lines of the interpreter thus resetting the binaries 31–34. This RESET signal is normally a positive signal and, therefore, should be inverted before it is impressed on the reset lines. Such an inversion may readily be obtained by passing the RESET signal from the receptor terminal 40 through any suitable conventional inverter 41 and impressing this inverted signal on line 42 in the interpreter.

Alternatively, during normal operation a RESET signal may be supplied by the inherent operation of the interpreter through resetting circuitry within the interpreter itself. This inherent resetting circuitry will be explained subsequently in connection with the processing of the binary signals through the interpreter. All three sources of the resetting signals are adapted to be impressed upon line 42 in the interpreter and, from this line, pass to a suitable one-shot pulse generator 43, which preferably is a two microsecond multivibrator, the negative pulse output of which is applied to the four binaries 31–34 so as to reset these binaries to a data signal receiving condition. The normally conducting side of each of these binaries is the conducting side when the binary has been reset, and is the side to which a triggering pulse or signal is adapted to be applied through one of the respective gates 27–30. Thus, under normal conditions, when a negative triggering signal is impressed on a binary from one of the gates 27–30, the binary is switched to its nonconducting state on the side to which the triggering pulse was applied. This results in a positive signal on the output of this side of the binary.

In order to assure an adequate operating signal power for the interpreter, the positive signals from the respective binaries 31–34 are preferably applied respectively to suitable conventional cathode followers 44, 45, 46, and 47. The output pulses of the binaries on the other sides thereof are consequently negative signals and these are also impressed upon the cathode followers 44–47 respectively so as to provide four pairs of binary signals as outputs of the cathode followers. These cathode follower output signals are utilized in converting the binary coded decimal data signals generated by the read head units 11-14 into the desired two-out-of-five data signals and the additional instruction or control signals which are required by the receptor component of the computing system to which these signals are adapted to be supplied.

In this embodiment of the invention, the four pairs of binary output signals are applied to input lines 48, 49, 50, 51, 52, 53, 54, and 55 of a code conversion matrix 56 which comprises a plurality of AND gates connected in such a manner as to convert the 1, 2, 4, 8 binary coded decimal code on the input leads of the matrix into a decimal code which is, in turn, converted by a plurality of suitably interconnected OR gates into a $\phi$, 1, 2, 3, 6 two-out-of five code which appears on the output leads 57, 58, 59, 60, and 61 of the matrix as positive signals. Since the input to the computer receptor component requires negative input signals, any suitable conventional inverters 62, 63, 64, 65, and 66 are respectively connected to the matrix output leads 57–61 so as to invert the $\phi$, 1, 2, 3, 6 two-out-of-five matrix output signals. These inverter output signals are not adapted to be supplied directly to the computer receptor component because the receptor component may not necessarily be ready to receive these signals at the exact time when they appear at the outputs of the inverters 62–66. Five two-input AND gates 67, 68, 69, 70, and 71 are, therefore, connected with one of the input of each of these gates respectively to the outputs of the inverters 62-66 and are arranged to control the supply of the inverter two-out-of-five output signals to the input computer receptor component data input terminals 72, 73, 74, 75, and 76, which respectively receive negative signals representing the $\phi$, 1,2,3,6 two-out-of-five data.

In order to control the transfer of the data signals and other information signals from the interpreter to the computer receptor component at the time when the receptor component is in condition to receive such signals and process them, the interpreter utilizes the OPERATION READ signal which it received from the receptor component as a request signal for controlling the generation of a signal which can be used to trigger all of the gates which are adapted to control the transfer of data and other information signals from the interpreter to the computer receptor component. This generation of a triggering signal is obtained by connecting the four inputs of a four-input OR gate 77 each respectively to the binary negative signal output leads 49, 51, 53 and 55 so that the occurrence of a binary coded digital signal in any of the four input channels of the interpreter will provide a negative input signal to the OR gate 77 whereby a negative pulse output is produced by this gate. The output of the OR gate 77 is applied as one of the inputs to a two-input AND gate 78, and the other input to the gate 78 is provided by the OPERATION READ signal whenever the computer receptor component requests information from the computer. This signal is readily applied to the gate 78 by connecting its other input to the interpreter input terminal 36 through a suitable line 79. When the AND gate 78 is provided with an input signal from the OR gate 77 and is triggered by an OPERATION READ signal it provides a negative output signal which is applied as a triggering signal to the control of a suitable one-shot (monostable) multivibrator 80. This one-shot multivibrator may be of any suitable conventional type and preferably has a 1.0 millisecond time characteristic. The positive output of the one-shot multivibrator 80 is connected to the input of a suitable differentiator 81, which may comprise a simple capacitance-resistance circuit, which differentiates the positive output signal and is connected to the triggering input of another 1.0 millisecond one-shot multivibrator 82. Both the positive and negative outputs of the one-shot multivibrator 82 are used in controlling the operation of the interpreter. The negative output signal of the multivibrator 82 is applied as the information control triggering signal to all of the gates which control the transfer of information signals from in the interpreter to the computer receptor component. This is obtained by applying this negative output signal of a one-shot multivibrator 82 to a triggering line 83, and this line is connected as the second input to each of the two-input AND gates 67–71 such that when a triggering signal is provided to these gates the $\phi$, 1, 2, 3, 6 two-out-of-five data signals are transferred from the interpreter to the computer receptor data input terminals 72–76 for processing.

Simultaneously with the transfer of the data signals to the computer receptor component the interpreter provides other information signals to other input terminals of the computer receptor component as these signals are required by the computer for a proper processing of the data which it receives. Three of these signals comprise SIGN signals which inform the computer of the sign to be applied to the data which it receives as data signals. Since all of the data read by the interpreter from magnetic tape records of the type recorded by magnetic digital recorders is positive data, the sign producing circuitry of the interpreter is permanently connected to provide the proper signal levels to the computer receptor component for all data transmitted thereto. This is obtained by providing a two-input AND gate 84 to one input of which the triggering line 83 is connected and to the other input of which a signal is provided for sign $\phi$. This latter input is permanently connected to the logical $\phi$, 83' in the interpreter, which in this instance is the positive power supply terminal for the interpreter so that the gate 84 prevents the passage of any signal to the computer receptor component terminal 84' to which it is connected. The other two SIGN signals are obtained by connecting one input of another two-input AND gate 85 to the triggering line 83 and the other input thereof to logical 1, 85' of the interpreter circuitry. This connection may be made to any suitable part of the interpreter circuitry as will be illustrated subsequently in the detailed description of the interpreter circuits. Thus whenever a triggering circuit is applied to the input of the AND gate 85 it will provide an output SIGN signal which will be the proper signal level for application to the remaining two sign input terminals 86 and 87 of the computer receptor component.

The computer receptor component also requires certain instruction or control signals in addition to the data and sign signals and one of these instruction signals is an INFORMATION signal for indicating to the receptor component that information is being supplied thereto on the occurrence of this signal. The interpreter provides such an INFORMATION signal by combining the gate triggering signal on the line 83 as one of the inputs to an AND gate 88 and connecting the other input of this AND gate to the interpreter input terminal 36 which receives the OPERATION READ signal from the computer receptor component. Thus, whenever the receptor component requests information from the interpreter by transmitting an OPERATION READ signal thereto, this signal controls the initiation of the interpretation of the code signals sensed by the read head 10, and when the interpreter has processed such data signals and converted them into the desired two-out-of-five code signals, the triggering signal from the one-shot multivibrator 82 simultaneously transfers the data information to the five data input terminals of the receptor component, the three SIGN signals to the three receptor component sign terminals, and transmits an INFORMATION signal from the gate 88 to an information terminal 89.

After each transfer of information has been completed by the interpreter to the computer receptor component it is necessary to reset the interpreter so that additional information can be processed by it for transmittal in the proper code and with the proper additional information signals to the receptor component. As has been previously explained, such resetting of the interpreter can be done manually by closing the switch 38 which will transmit a resetting pulse to the binaries 31–34, or the resetting may be accomplished as the result of the receiving of a RESET signal by the interpreter from the receptor component terminal 40. For normal operating conditions, the resetting of the binaries will be provided by a RESET signal inherently generated within the interpreter as a result of the completion of the processing of one character of information and the transmittal of this information to the computer receptor component. This inherent resetting of the binaries is obtained by connecting the positive pulse output terminal of the one-shot multi-vibrator 82 to the input of a differentiator 90 which may be of any suitable conventional type, such as a properly proportioned capacitance-resistance network. A suitable differentiator for this purpose is described in "Reference Data for Radio Engineers," fourth edition, International Telephone and Telegraph Corporation, New York, N.Y. (1956), pages 458, 460 and 461 (see particularly FIG. 7). This differentiator produces a negative output pulse, as shown in FIG. 1, and this pulse is applied to a conventional buffer 91 whose output is connected to the reset line 42 and therefore provides the triggering signal to the one-shot multivibrator 43 whose output is connected to the resetting inputs of the binaries 31–34. Since a one-shot multivibrator may be triggered by applying a signal to one of its outputs, and since the multivibrator 43 is connected to be reset triggered by two other sources, the insertion of the buffer 91 in the output circuit of the multivibrator 82 prevents these two other sources from triggering this latter multivibrator through its output to the differentiator 90.

In order inherently to obtain the desired sequence of operation of this resetting of the interpreter for the successive processing of information words therethrough, the positive output signal of the one-shot multivibrator 82 is delayed approximately one millisecond after the start of the negative triggering signal output of the multivibrator 82. This delay is obtained by the differentiating of the positive output signal of the multivibrator 82 through the differentiator 90 and the buffering of the output of the differentiator 90 by the buffer 91 before it is supplied to the one-shot multivibrator 43. This multivibrator 43 preferably has approximately a two microsecond time characteristic so as to provide for resetting the binaries 31–34, which are reset after the various information gates of the interpreter have been triggered by the negative triggering signal on the line 83 and have transmitted the information respectively contained in the various AND gates to the computer receptor component. This resetting of the binaries 31–34 also is done at a speed which will place them in condition for receiving any data signal information prior to the reading of the next information word by the magnetic read head 10. This latter is accomplished by suitably controlling the movement of the magnetic tape past the read head by providing for operation of the tape transport at a speed which will produce this result.

Whenever the computer receptor component program requires information from its input, its operation read terminal 35 is switched to its low state, which conditions the computer input circuits and provides a signal requesting the external interpreter to read and provide it with additional information. This line and terminal of the computer receptor component remains in the low state until an END-OF-CARD signal is received by the receptor. When this END-OF-CARD signal is received, it is a signal that the reading of a word by the read head 10 has been completed. When this occurs, circuitry within the receptor component places the operation read terminal 35 in its high state. This high or positive state is transmitted to the interpreter terminal 36 and thence to the four AND gates 27–30 which are thereby inhibited from passing signals therethrough.

Whenever a complete record or file has been read by the interpreter, it is desirable to provide the computer receptor component with a control signal which will indicate this condition. Such a signal may be generated as the result of a coded recording on the magnetic tape being sensed by the read head 10, or may be determined by an extra length of blank space on the magnetic tape. Since, in every instance, the end of a record also is the end of a word of information, the interpreter is adapted to provide an END-OF-FILE signal indicative of the end of the record, together with an END-OF-CARD signal which is indicative of the end of a word. Under certain circumstances, the end-of-card record will have been provided to the computer receptor component prior to the END-OF-FILE signal and the receptor component will have returned its operation read terminal 35 to its low state, indicating that it is in condition for receiving additional information for processing. If this be the case, the interpreter will provide both the END-OF-FILE signal and an END-OF-CARD signal which will terminate the operation read condition in the computer receptor component. In order to operate the interpreter, it is necessary for the connected computer receptor component to provide a new OPERATION READ request signal for each new word. Such requests are initiated by the circuitry of the computer receptor component and do not form part of the present invention.

Figure 7:
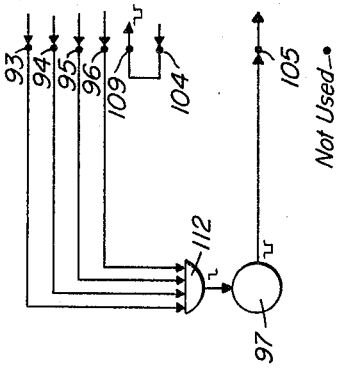
FIGS. 6 and 7 are alternative logic diagrams illustrating arrangements which may be used for providing desired END-OF-CARD and END-OF-FILE instruction or control signals.

The interpreter shown in FIG. 1 may be connected to provide the END-OF-CARD and END-OF-FILE signals by either of two optional circuits, depending upon whether the END-OF-FILE is to be read as a coded signal on the magnetic tape, or as an extra length of blank tape at the end of a record. These two optional circuits can both be incorporated in the interpreter, if it be desired, or the interpreter may be designed to read and utilize either selected one of these end-of-record designations for providing the END-OF-FILE signal to the computer receptor component. The END-OF-CARD and END-OF-FILE signals are adapted to be produced by an end-of-file signal component 92, details of which are illustrated in FIGS. 6 and 7, which represent the two optional circuits for use with the two optional modes of indicating the end of a record on the magnetic tape.

Figure 6:
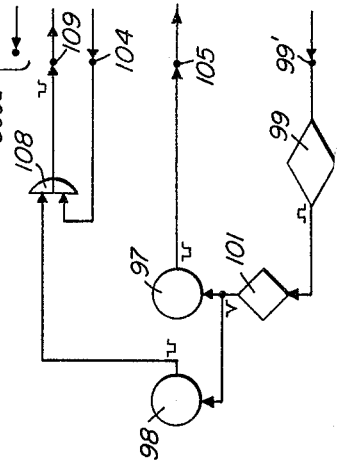

FIG. 6 shows circuitry for providing the desired END-OF-CARD and END-OF-FILE records when the end of a record is indicated on the magnetic tape by an extra length of blank tape. In this arrangement, the connection of the end-of-file component terminals 93, 94, 95, and 96 are not used because no signals will appear on these terminals as a result of the blank space at the end of a record on the magnetic tape. Consequently, it is necessary to generate an END-OF-FILE signal because of the lack of any information data signals in all of the four input channels of the interpreter. Under these conditions, the absence of a data signal for 30 milliseconds is utilized to trigger an 80 millisecond one-shot multivibrator 97 and a 100 microsecond one-shot multivibrator 98 by providing a time delay element 99 connected to the output of a one-shot multivibrator 100. This time delay element 99 may comprise an suitable member, such as a slow release relay of the type described in "FM and Television," volume 8, October and November 1948, Part I of "Stepping-Switch Operation," T. L. Sipp, in the section entitled "Auxiliary Release," page 29, last paragraph of column 1 and the top of column 2, or by suitable tube or transistor circuits using capacitor charge principles, such as those described in "Digital Computing Systems," Williams, (McGraw-Hill) 1959, under "Electrical Delay Lines," pages 146–147, and in "Design of Transistorized Circuits for Digital Computers," Pressman, (Rider) 1959, pages 9 and 10, "Time Delay Element."

This time delay element 99 is arranged so that it will produce a pulse if it receives no input for a period of 30 milliseconds. Such an output of the time delay element may be a positive or a negative pulse, depending upon the circuit and the nature of the element. If it produces a positive pulse, a differentiator 101 of any suitable conventional type, such as those previously described, is connected in the circuit between the output of the time delay element 99 and the input to both the one-shot multivibrators 97 and 98, so as to produce a negative trigger pulse for these two one-shot multivibrators as a result of the positive output pulse of the time delay element 99. If the time delay element 99 produces a negative output pulse, its output may be connected directly to the input of the one-shot multivibrators 97 and 98 without the use of the differentiator 101.

During normal operation, an END-OF-CARD signal will be obtained as a result of a 4, 8 data signal being read by the read head 10 from the magnetic tape. This 4, 8 data signal on the magnetic tape is used to indicate the end of a word on the tape and is entered in the tape after the recording of each word thereon. Thus, whenever the read head 10 senses a 4 and an 8 in the magnetic tape, signals are transmitted through the interpreter and appear on the output leads of the binaries 33 and 34 and pass through the cathode followers 46 and 47, becoming output signals on the pairs of output leads connected to these two cathode followers. Under these conditions, the output leads 53 and 55 of the cathode followers 46 and 47 respectively receive a negative signal which is fed from each of these leads respectively to a two-input AND gate 102. This gate thereupon emits a negative triggering signal which is impressed upon the control input of a one-shot multivibrator 103. The negative output terminal of the one-shot multivibrator 103 is connected to the input triggering terminal of the one-shot multivibrator 100 and also to the end-of-file signal component terminal 104. When the one-shot multivibrator 100 receives such a triggering signal, its negative output terminal will be provided with a negative signal for maintaining operation of the tape transport motor for a predetermined time after the occurrence of this signal in order to minimize starting and stopping of the tape transport and, preferably, to maintain a continuous drive of the tape transport until a complete file or record has been sensed. Details of this operation will be explained in connection with the circuit for controlling the operation of the tape transport.

Upon the occurrence of a time delay signal from the time delay element 99, and its supply as a negative input triggering signal to the one-shot multivibrator 97, a negative END-OF-FILE signal is impressed on the end-of-file signal component terminal 105. This END-OF-FILE signal is transmitted through the interpreter to a two-input AND gate 106 which is adapted to be triggered on the occurrence of the next succeeding OPERATION READ signal from the computer receptor component by having the second input of the end-of-file gate 106 connected to the interpreter input terminal 36. In this manner, the END-OF-FILE signal which is generated by the interpreter on the occurrence of an extra length of blank tape is transmitted to an end-of-file input terminal 107 of the computer receptor component, and this is a control signal which informs the receptor component that the end of the data file has been reached.

When an END-OF-FILE signal is thus generated, an END-OF-CARD signal also is generated by the interpreter. This is obtained from the output of the one-shot multivibrator 98 which is triggered by the same negative signal which triggers the one-shot multivibrator 97. The one-shot multivibrator 98 negative signal output is connected to one of the inputs of a two-input OR gate 108. The other input of the OR gate 108 is connected to the end-of-file signal component terminal 104, such that the occurrence of the 4, 8 data signal on the magnetic tape which triggers the one-shot multivibrator 103 and provides a negative output signal therefrom which is impressed on the terminal 104 also provides for an output from the OR gate 108. In this manner, either the occurrence of an END-OF-CARD signal in the magnetic tape record, or the occurrence of an extra length of blank tape which generates an END-OF-FILE signal will result in the appearance of an END-OF-CARD signal on the output of the OR gate 108. This OR gate output is connected to the end-of-file signal component terminal 109 and is passed through the interpreter circuitry to another two-input AND gate 110. The other input of the AND gate is connected to the OPERATION READ input terminal 36 of the interpreter such that an END-OF-CARD signal will be passed to an end-of-card terminal 111 of the computer receptor component on the occurrence of the next OPERATION READ signal from the receptor component. Thus the END-OF-CARD signal may be supplied to the receptor component as the result of the occurrence of either an END-OF-WORD 4, 8 record being sensed by the read head 10 or as a result of an extra length of blank tape which results in the production of an END-OF-FILE signal and also an END-OF-CARD signal.

FIG. 7 illustrates an alternative arrangement for providing the desired END-OF-CARD and END-OF-FILE signals to the computer receptor component. This arrangement is adapted to be used to provide these signals when the end of a record on magnetic tape which is being sensed is indicated by a 1, 2, 4, 8 recording thereon. When such a recording is sensed by the read head 10, data signals are processed by the interpreter and appear on each of the four pairs of binary leads which are connected to the outputs of the cathode followers 44–47. The lead of each of these pairs on which a data signal produces a negative signal, that is the leads 49, 51, 53, and 55, is connected respectively to the end-of-file signal component terminals 93, 94, 95 and 96. These terminals are in turn connected to the inputs of a four-input AND gate 112 so that on the occurrence of all of the data signals 1, 2, 4 and 8 a negative signal will appear on the output of the AND gate 112. This negative output signal of the AND gate 112 is impressed as the triggering input signal on the one-shot multivibrator 97, which has its negative signal output connected to the end-of-file signal component terminal 105. This negative output signal from the one-shot multivibrator 97 is the same type of signal as that produced by this multivibrator in the circuit shown in FIG. 6 and operates in the same manner to provide the computer receptor component with an END-OF-FILE signal.

Since the 1, 2, 4, 8 signal sensed by the read head 10 which produces the END-OF-FILE signal contains the data signals 4 and 8 which are used to designate an end-of-card, the occurrence of the 1, 2, 4, 8 binary signals on the binary output leads 49, 51, 53, and 55 provides signals to both of the inputs of the two-input gate 102, which will therefore pass a triggering signal to the one-shot multivibrator 103 and provide a negative signal to the END-OF-FILE signal component terminal 104, as has been previously described. In the arrangement shown in FIG. 7 the terminal 104 is simply connected directly to the terminal 109, so that the signal which is received by the terminal 104 is passed directly to the two-input AND gate 110 which is connected to the end-of-card terminal 107 of the computer receptor component. The operation of the two-input AND gate 110 with the arrangement of FIG. 7 is the same as that which has been explained with reference to the arrangement shown in FIG. 6, such that the operation of the computer receptor component is the same with either of the arrangements of FIG. 6 or 7.

Under certain conditions the computer receptor component requires that a reset END-OF-FILE-4 signal be provided as an independently manually controlled signal. This can be readily obtained in the interpreter by providing a manually operable switch 113 connected to a suitable negative source of voltage which can be used to trigger a pulse generator 114 similar to the pulse generator 39 for generating a negative pulse or signal. The computer receptor component requires that the END-OF-FILE-4 signal supplied to its terminal 115 be a positive pulse. This can readily be obtained by impressing the negative output pulse of the pulse generator 114 as the triggering pulse on a suitable conventional one-shot multivibrator 116 which is adapted to have its positive output terminal connected to the computer receptor component terminal 115.

Operation of the interpreter is dependent upon a proper sensing of a record such as the record in a magnetic tape and the synchronization or timing of the sensing of the record by the read head to the requirements of the computer receptor component and to the time characteristics of the various electronic components of the interpreter. It has been found that with this type of interpreter a suitable operation can be obtained by moving magnetic tape across the read head 10 at the rate of 30 inches per second. This provides approximately 4 milliseconds between each word on the magnetic tape with the pack density which is currently obtainable with magnetic digital recorders. Since it is desirable not to stop the operation of the tape transport until the end of a record has been reached, and since it also is desirable that the computer receptor component should control the start of the tape movement when it is in condition for receiving information data, the interpreter has been provided with an arrangement to keep the tape moving for 5 milliseconds after the end of each END-OF-CARD signal. This is obtained by providing a circuit for starting the operation of the tape in response to a request by the computer receptor component for information. This request is supplied to the interpreter by the OPERATION READ signal which is impressed on the interpreter terminal 36. The signal is then passed from the terminal 36 to a two-input OR gate 117 the output of which is negative whenever an OPERATION READ signal is supplied to the interpreter. The other input of the OR gate 117 is connected to the negative output of the one-shot multivibrator 100, such that a signal is impressed on the OR gate 117 from this multivibrator 100 whenever an END-OF-CARD signal is received by it, as has been previously explained.

The output of the OR gate 117 is inverted by a suitable conventional inverter 118 and the positive signal from the inverter 118 is applied to a suitable relay driver 119 which is connected to a suitable relay operating coil 120 so that the coil will be energized whenever a positive signal is received by the relay driver 119 from the inverter 118. This energization of the relay coil 120 will actuate a contactor 121 of the relay and open a circuit through relay contacts 122 so as to deenergize a suitable brake 123 and release the magnetic tape driving capstan 124. Energization of the relay coil 120 also causes its contactor 121 to close a circuit through contacts 125 which energize a coil 126 of a second relay so that its relay contactor 127 closes an alternating current energizing circuit through relay contacts 128 and the energizing circuit of an alternating current synchronous motor 129. The synchronous motor 129 is the driving motor for the tape transport capstan 124 and is constructed and arranged to provide the desired movement of the magnetic tape across the read head 10 during the time when its circuit is energized and the brake 123 is deenergized. Thus it will be seen that when either an OPERATION READ signal is received by the interpreter or an END-OF-FILE signal is generated by the interpreter, the OR gate 117 will pass a signal which will result in the deenergization of the brake 123 and the energization of the tape transport driving motor 129.

In order to minimize starting and stopping of the tape transport and to obtain a continuous operation for each complete record or file on the magnetic tape, the 5 millisecond time characteristic of the one-shot multivibrator 100 provides for the application of its negative output to the input of the OR gate 117, 5 milliseconds after an END-OF-CARD signal has been sensed. Thus the relay coil 120 will remain energized for 5 milliseconds after the sensing of an END-OF-CARD record. It is thus necessary for the programmer to provide for a new OPERATION READ signal prior to the occurrence of the first digit of the next word on the magnetic tape so that this OPERATION READ signal will keep the relay coil 120 energized during the reading of the ensuing word. It has been found that when the magnetic tape is moved at 30 inches per second across the read head 10 there is less than 5 milliseconds between the end-of-word recordation on the tape and the first digit of the next word. This gives the programmer 4 milliseconds between words for computation to be performed by the computer receptor component with each word which it receives. Thus it is possible with the present interpreter to read successive words on small magnetic tape in four-channel code, interpret this code into a two-out-of-five code and produce the necessary control and instruction signals for a computer receptor component, while providing sufficient time for this component to make the desired computation with the data and instructions thus received, and to keep the tape moving continuously over the sensing read head of the interpreter, thereby providing a very efficient equipment for sensing such magnetic tape records and supplying them to a computer in the form of signals which can be readily and rapidly utilized by the computer.

*Binary code signal developing apparatus*

The interpreter illustrated in FIG. 1 utilizes the same circuitry in each of the four channels for developing a binary code signal from the four-channel binary coded decimal code sensed by the read head 10. As has been explained, the detailed circuitry and the electronic elements utilized in the circuitry can be any suitable conventional elements and interconnections thereof, either of the tube or solid state type, which will provide the logical results required for the respective parts of the interpreter. In order to facilitate an understanding of the detailed operation of the various components which cooperate in producing the interpretation provided by the interpreter, a sample circuit is illustrated in FIG. 2 for carrying out the logics of the interpreter in one of the channels extending from a read head unit to the binary output leads on which the binary signals are impressed.

Figure 2:
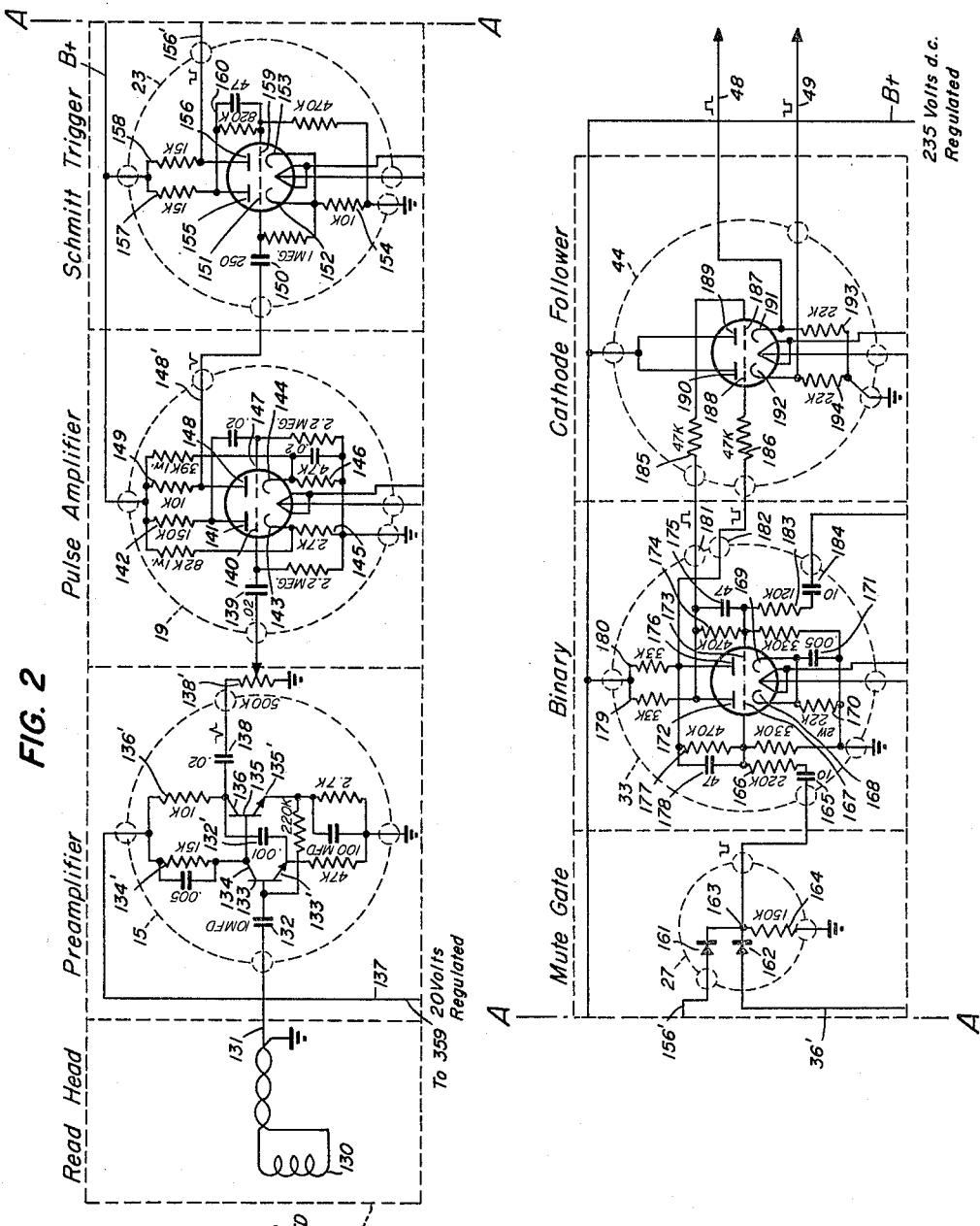
FIG. 2 is a schematic circuit diagram illustrating the circuitry of a sample channel of the interpreter shown in FIGS. 1 and 8, from the data sensing read head to the amplified binary cathode follower output, with the circuit shown broken along line A—A to facilitate an illustration thereof.

The channel for the 1's of the 1, 2, 4, 8 binary coded decimal code is shown in FIG. 2 and comprises the read head unit 11, which is provided with any suitable read head coil 130 adapted to provide a relatively small data signal on its output line 131 when the read head senses a bit in the 1's channel of magnetic tape which is moved across the read head coil 130. This may be considered as a data signal and, normally, would be only approximately several millivolts, so that it is necessary that it be amplified in order to provide a useful signal in the system. Such amplification preferably is provided by a preamplifier 15 which, in the illustrated circuit, is shown as a two-stage transistor amplifier. Such an amplifier may include any suitable transistor circuit, such as that shown in FIG. 2, which is of the type, the operation of which is explained in "Pulse and Digital Circuits," Millman and Taub, (McGraw-Hill) 1956, beginning at page 573. A similar type amplifier using tubes is described in this book on pages 5 and 6. The specific values of the capacitive and resistive elements connected to the transistors in this amplifier are given as illustrative only and, obviously, can be varied as the requirements of the connected circuits may dictate. A more complete explanation of amplifiers of this type, and the characteristics which may be obtained by various coupling elements, is given in detail in "Transistor Electronics," DeWitt and Rossoff, (McGraw-Hill) 1957, pages 204–214 (note particularly FIGS. 8–12).

The input to the preamplifier is supplied by the read head coil 130 and is coupled thereto through the output lead 131 and a suitable coupling condenser 132. The first stage of amplification is provided by applying the input signal from the condenser 132 directly to the first transistor base 133, and coupling the amplified output of this first transistor to the second amplifier stage by connecting the collector 134 of the first transistor directly to the base 135 of the second transistor to provide the input bias thereto. The emitters 133' and 135' of both transistors are grounded through resistors and the collector 136 of the second transistor is coupled to the first transistor by a condenser 132' connected between the collector 136 and the emitter 133'. The collectors 134 and 136 are connected through loading resistors 134' and 136' respectively to a clamped 20 volts D.C. regulated voltage on line 137. The collector 136 of the second transistor is used as the output of the second stage of the preamplifier 15 and is coupled through a condenser 138 and a variable resistor 138' to a two-stage pulse amplifier 19.

This pulse amplifier may comprise any suitable tube or solid state amplifier, and is shown as a tube circuit to which the input pulse from the transistor preamplifier 15 is applied to a coupling condenser 139 and from it to the first stage grid 140. The first stage plate 141 is connected to a 235 volt regulated D.C. voltage B+ through a loading resistor 142, and the cathodes 143 and 144 of both amplification stages are grounded through resistors 145 and 146. Filaments of all tubes are energized by a six volt source, as shown in the power source circuit, FIG. 5. The first stage plate 141 also is connected to the second stage grid 147, and the second stage plate 148 is connected to a 235 volt D.C. regulated voltage B+ through a loading resistor 149. This provides an amplified output on plate 148, as indicated by the negative peaked pulse symbol, which forms the amplified data signal on the amplifier output lead 148' coupled through a condenser 150 to the Schmitt trigger 23, and is applied therefrom directly to a first stage grid 151 in the trigger. The two trigger cathodes 152 and 153 are connected together and grounded through a resistor 154. This type of cathode-coupled binary circuit is described in detail in "Pulse and Digital Circuits," supra, pages 164–172, and "Reference Data for Radio Engineers," supra, pages 468–469. The particular advantage of this circuitry is that it has the property of providing an output of constant peak value, a flat-topped pulse, for the period that the input waveform exceeds a predetermined value. This is illustrated by the symbol on the output of the Schmitt trigger 23.

The two trigger plates 155 and 156 are connected to the B+ voltage through loading resistors 157 and 158, respectively, and the first stage plate 155 is connected to the second stage grid 159 through a resistance-capacitance network 160. The square wave output is taken from the second stage plate 156 and appears on the trigger output lead 156'. This is the trigger data signal which forms one of the pulse inputs to the two-input AND gate 27. This gate comprises two suitable diodes 161 and 162 with a common output junction 163. The trigger data signal from the Schmitt trigger 23, which represents the bit sensed by the read head coil 130, is impressed on the diode 161, while the common junction point 163 of the gate is grounded through a loading resistor 164, and, as has been explained with reference to FIG. 1, the second input to the AND gate 27 is the OPERATION READ signal from the computer receptor component. When this signal is received by the interpreter, it is impressed on the terminal 36 and transmitted over line 36' to the diode 162, thus impressing a negative signal on both AND gate diodes 161 and 162, whereby a negative signal is passed by the gate, as shown by the symbol on the output of the gate 27.

In order to facilitate conversion of the data signals passed by the gates 27, 28, 29, and 30, FIG. 1, the output of each of these gates is respectively impressed on a binary of any suitable type, such as the bistable (flip-flop) circuits described in "Pulse and Digital Circuits," supra, pages 140–143 (tube circuits) and pages 595–602 (transistor circuits), and in "Reference Data for Radio Engineers," supra, pages 466–467. The illustrative circuit of FIG. 2 shows a tube circuit for the binary 31 and includes a coupling condenser 165 connected through a resistor 166 to one of the grids 167 of the binary. The circuitry and operation of binaries of this type are well known. In this instance, the two cathodes 168 and 169 are grounded through a common resistor 170 which provides a desired self bias thereto, and a bypass condenser 171 shunts the resistor 170 so as to maintain the cathode voltage essentially constant during transition of the binary. As in the conventional binary the grid of one stage is coupled to the plate of the other stage so as to assure the desired bistable condition of the binary. In this instance, the first plate 172 is coupled to the second grid 173 through a coupling resistor 174, and a condenser 175 is shunted across the resistor 174 so as to compensate the coupling attenuation. Similarly, the second plate 176 is coupled to the first grid 167 through a coupling resistor 177 shunted by an attenuation compensating condenser 178, both of the plates 172 and 176 being connected through loading resistors 179 and 180, respectively, to the B+, 235 volt regulated voltage line.

Under normal operating conditions, the first plate 172 will be conducting and, therefore, at low potential, and the binary output terminal 181 will likewise be at low potential. On the passage of a negative pulse by the gate 27, the grid 167 will pass the cut-off point and the voltage of the first plate 172 will rise toward B+. This will bias the grid 173 and the second plate 176 will conduct, whereby its potential and consequently that on the second binary output terminal 182 will become low. The pulse symbols adjacent to the binary output terminals 181 and 182 indicate the signals resulting thereon from the application of a data pulse from the gate 27 on the binary input coupling condenser 165 indicative of the sensing of a data bit by the sensing head coil 130 and the receipt of an OPERATION READ signal from the computer receptor component. Resetting of the binary 31 is accomplished simply by impressing the negative RESET signal from any of its three sources, as previously explained with reference to FIG. 1, on the second grid 173 through a resistor 183 and coupling condenser 184. This flips the binary in the reverse sense from that explained for the application of a data pulse from the gate 27 and resets the binary 31 to its initial sensed data signal receiving conditions.

For most tube circuits in carrying out this invention, it will be found desirable to provide cathode followers in the output circuits of the binaries 31, 32, 33, and 34, as has been shown in FIG. 1. These cathode followers may be of any suitable type, examples of which are described in "Pulse and Digital Circuits," supra, pages 11–22, and are especially useful because of the characteristics of the output, which are: that it is linearly related to the input and is produced without inversion of signal.

The outputs of binary 31 on the output terminals 181 and 182 are impressed upon parasitic suppressor resistors 185 and 186 connected to the two inputs of the cathode follower 44. Both circuits through each cathode follower are identical and function in the same respective manner, so that the operation of only one such circuit will be described.

The input signals on the suppressor resistors 185 and 186 are applied to respective grids 187 and 188, while the related plates 189 and 190 are connected directly to B+, the 235 volt D.C. regulated voltage, and the respective cathodes 191 and 192 are grounded through resistors 193 and 194. The respective amplified binary output signals are obtained on the cathodes 191 and 192 and are impressed on the pair of binary output leads 48 and 49, as are indicated by the symbols on these leads. These are the binary coded decimal signals which are utilized by the interpreter for producing the desired two-out-of-five coded data signals and the associated instruction or control signals for use by a computer receptor component.

*Conversion matrix*

In the embodiment of this invention illustrated in FIGS. 1–7, binary coded decimal signals which appear on the four pairs of binary output leads 48–49, 50–51, 52–53, and 54–55, indicative of the presence or absence of the sensing of data bits in the magnetic tape by the sensing head 10, are adapted to be converted by a conversion matrix 56 into two-out-of-five coded signals. This conversion matrix is illustrated in detail in FIG. 3 and comprises a decoder unit which decodes 1, 2, 4, 8 binary coded decimal signals by a plurality of AND gates into decimal signals and an encoder unit which encodes the decimal signals by a plurality of OR gates into $\phi$, 1, 2, 3, 6 two-out-of-five code signals. The 1, 2, 4, 8 binary coded decimal signals appear as positive signals on leads 48, 50, 52, and 54 and as negative signals on leads 49, 51, 53, and 55, that is, a positive signal appears on one lead of a pair of leads and a negative signal appears on the other of each pair of leads. This is indicated by the symbol on the respective leads 48–55 in FIG. 3, which comprise the binary coded decimal input leads to the decoder unit of the conversion matrix.

The decoder unit comprises a plurality of diodes which connect certain of the input leads 48–50 to certain of the decimal leads 200, 201, 202, 203, 204, 205, 206, 207, 208, and 209 of the decoder unit, and, since there are four channels in the 1, 2, 4, 8 binary coded decimal input leads, a simple decoder could be formed by providing ten four-input AND gates, each connecting one of the ten decimal leads 200–209 to certain of the binary input leads 48, 50, 52, and 54. Each of these four-input gates would require four diodes, and such a decoder would require a total of forty diodes. In accordance with the present invention, it is not necessary to provide forty diodes in the decoder unit to obtain a complete decoding of the binary coded decimal signals.

This economy in diodes is obtained by an improved connection of the input leads to the decimal leads. Each of the decimal leads 200–209 is adapted to be clamped, respectively, through clamping resistors 210, 211, 212, 213, 214, 215, 216, 217, 218, and 219 to the 235 volt D.C. regulated voltage B+.

In order to explain the efficient utilization of a minimum number of diodes used in the decoder unit of the conversion matrix 56, the conversion of each 1, 2, 4, 8 binary coded decimal digit signal into a decimal signal will be analyzed. In the 1, 2, 4, 8 binary coded decimal code, the bits 2 and 8 are used to designated zero ($\phi$). Since the presence of a bit sensed by the sensing head produces a positive binary input signal, the presence of the bits 2 and 8 on the binary leads will provide a positive signal on the matrix input leads 50 and 54 while providing negative signals on the input leads 51 and 55. Under these conditions, no binary output signals will be provided to the input pair of leads 48 and 49 representing 1 in binary coded decimal code and no output binary signal will appear on the pair of binary leads 52 and 53 representing 4 in binary coded decimal code. The matrix input leads 48 and 52 are, therefore, in a low voltage state, since the side of the binaries connected thereto are in the current conducting state; and the matrix input leads 49 and 53 are in the high voltage state, since the sides of the binaries connected thereto are in the nonconducting or cut-off state. Similarly, the two matrix input leads 50 and 54 are in a low voltage state whenever no binary signal appears thereon indicative of a binary coded decimal digit and the matrix input leads 49 and 53 are in a high voltage state because of the same conditions. In the decoder unit of the conversion matrix 56, it is desirable to connect each respective decimal lead to input leads, such that the decimal lead representing 0 decimal digit will change from a low voltage state to a high voltage state when a binary coded decimal signal appears on the input leads of the matrix corresponding to the decimal digit represented by the respective decimal lead.

In order to obtain this type of operation, the respective decimal lead is connected by one or more diodes to the respective input leads which are in a high voltage state when a binary coded decimal signal appears in the channel or channels representative of the decimal digit. Thus, for a binary coded decimal $\phi$, the decimal lead 200 is connected through diodes 220 and 221 to input leads 50 and 54. When no binary input signal appears on any of the input leads to the matrix, current will flow from the B+ voltage through the clamping resistor 210 and the diodes 220 and 221, respectively, along leads 50 and 54 to the conducting sides of the respectively connected binaries 32 and 34. Such a flow of current produces a drop in voltage across the clamping resistor 210, reducing the potential on the decimal lead 200 to its low state.

In order to utilize the change of the voltage on the decimal leads from a low state when no decimal digit is represented on the decimal lead to a high voltage state when a decimal digit is represented on the decimal lead, the decimal leads in the conversion matrix form the output leads of the decoder unit and likewise the input leads to the encoder unit. In the illustrated encoder unit, five output leads 57–61 are provided on which two-out-of-five coded signals are adapted to appear respectively representative of $\phi$, 1, 2, 3, and 6. In the two-out-of-five $\phi$, 1, 2, 3, 6 code, zero is represented by signals on the 1 and 2 leads. As in any two-out-of-five code, each encoded digit requires signals on two, and only two, of the five leads 57–61. This assures against error if signals appear on an odd number of these leads.

In the encoder unit, the five output leads, 57–61 are respectively connected through clamping resistors 235, 236, 237, 238, and 239 to a common terminal 240 which is maintained at a voltage substantially equal to the low voltage state of the decimal leads 210–219. This voltage of the common terminal 240 is obtained from any suitable source, such as a potentiometer 241 connected between the 235 volt D.C. regulated voltage B+ and ground. In the encoder unit, the zero decimal lead 200 is connected by diodes 242 and 243 to the output side of the clamping resistors 236 and 237, so that when a 1, 2, 4, 8 binary coded decimal code zero is not being sensed, the decimal lead 200 is in its low state and, therefore, the voltage on both sides of the diodes 242 and 243 are at the same value. Under these conditions, no current will flow through the clamping resistors 236 and 237 and the output leads 58 and 59 of the encoder unit remain at their low voltage state.

When a 1, 2, 4, 8 binary coded decimal code zero is sensed, a positive signal appears on the matrix input leads 50 and 54 which is equal to the B+ voltage to which the input terminal of the clamping resistor 210 also is connected. Under these conditions, the diodes 220 and 221 of the decoder unit become nonconductive, so that the voltage on both terminals of the clamping resistor 210 become equal to B+. This impresses the B+ voltage on the decimal lead 200, and thereby causes the diodes 242 and 243 of the encoder unit to become conductive, so that current flows through the clamping resistors 236 and 237 to the lower voltage of the potentiometer 241. Since the terminals of the clamping resistors 236 and 237 which are respectively connected to the diodes 242 and 243 are the high potential sides of the resistors under this condition, the matrix output leads 58 and 59 are raised substantially to the potential of the decimal lead 200. This therefore provides a positive signal on the output leads 58 and 59 in response to the sensing of a zero in the 1, 2, 4, 8 binary coded decimal data, and, since a signal on these two leads represents a zero in the $\phi$, 1, 2, 3, 6 two-out-of-five code, a complete conversion has been made in the conversion matrix from the 1, 2, 4, 8 binary coded decimal code to the $\phi$, 1, 2, 3, 6 two-out-of-five code.

Following this same analysis, it will be found that the digits 1–9 in the 1, 2, 4, 8 binary coded decimal code, which produce corresponding binary signals on the conversion matrix input leads 48–55, can be decoded individually into decimal digit representations on decimal leads 201–209 by connecting the respective decimal leads to the matrix input leads 48, 50, 52, and 54, respectively, by diodes 222; 223; 224 and 225; 226; 227 and 228; 244 and 245; 246; 247 and 248; 249; and 250 and 251.

It will be noted, however, that with these diode connections alone, certain of the decimal digits will not produce a high voltage state on the decimal leads on the occurrence of the respective 1, 2, 4, 8 binary coded decimal signal on the matrix binary input leads because of interconnections between certain of the input leads and decimal leads which will tend to maintain the decimal leads in a low voltage state when the respective binary input leads of the conversion matrix receive a binary coded decimal signal for the decimal digit in question. This is brought about because of the use of the various combinations of 1, 2, 4, 8 binary coded decimal channels for the coding of decimal digits other than 1, 2, 4 and 8. For instance, the binary coded decimal 1 is used in coding the decimal digits 1, 3, 5, 7 and 9. As a result, whenever any of these decimal digits is sensed in the 1, 2, 4, 8 binary coded decimal code, a signal will appear on the input lead 48 which would cause the decimal lead 201 to go to its high voltage state, if provision were not made to inhibit this combination when the binary coded decimal digit represents a decimal 3, 5, 7 or 9.

This can readily be done by connecting the decimal lead 201 to the binary leads 51, 53, and 55 respectively through diodes 252, 253, and 254. By so doing, when the binary coded decimal 3 is sensed, it provides input signals to the conversion matrix on leads 48 and 50 representative of the 1 and 2 bit in the magnetic tape binary coded decimal recording, and the matrix input lead 51 will receive a negative signal, thus allowing current to flow from B+ through the clamping resistor 211 and the diode 252 to the conducting side of the binary 32 to which the lead 51 is connected. This flow of current through the diode 252 will produce a drop in voltage across the clamping resistor 211 and maintain the decimal lead 201, which represents the decimal digit 1, in its low voltage state.

Similarly, the appearance of a binary coded decimal digit 5 on the binary input leads to the conversion matrix will place the input leads 48 and 52 in their high state. This would tend to inhibit the flow of current through the diode 222 and thereby tend to raise the decimal lead 201 to its high state. The diode 253 which is connected between the decimal lead 201 and the matrix input lead 53 will, however, provide for the flow of current from B+ through the clamping resistor 211 and the diode 253 to the matrix binary input lead 53, as this lead is in its low voltage state when a binary input signal is impressed on the binary lead 52. Under these conditions, the flow of current through the clamping resistor 211 again will produce a drop in voltage thereacross, such that the decimal lead 201 will be in its low voltage state corresponding to the low voltage state of the input of the binary lead 53. In this manner, a 1 decimal digit will not be indicated on decimal lead 201 when a 5, encoded in the 1, 2, 4, 8 binary coded decimal code, appears on the conversion matrix input leads.

Since a decimal 7 digit is encoded in the 1, 2, 4, 8 binary coded decimal code so as to produce a binary input signal to the conversion matrix on leads 48, 50, and 52, the binaries 252 and 253 both will permit the passage of current through the clamping resistor 211 respectively to their connected leads 51 and 53, which are in a low voltage state under this condition. Thus, when binary signals representative of the decimal digit 7 appear on the matrix input leads 48, 50, and 52, the decimal lead 201 will remain in its low state and will not give an erroneous indication on the output leads 231 and 232 of the matrix encoder.

The decimal digit 9 is represented in the 1, 2, 4, 8 binary coded decimal code by a bit in the 1 and 8 channels; thus, when a 9 is sensed by the sensing head 10 of the interpreter, a positive signal is impressed on the conversion matrix binary input leads 48 and 54. This would tend to inhibit the flow of current through the clamping resistor 211, because the diode 222 will become nonconducting under these conditions. The connection of a diode 254 between the decimal lead 201 and the input lead 55 will inhibit this rise in voltage on the decimal lead 201, since the lead 55 is placed in its low voltage state by the binary 34 connected thereto when a binary signal is impressed on the lead 54 due to the sensing of the 1, 2, 4, 8 binary coded decimal encoded digit 9. In this manner, the decimal lead 201 is prevented from providing an erroneous signal on the matrix output leads 58 and 59 when a binary coded decimal digit 9 is sensed by the interpreter.

A similar analysis of each of the decimal leads will indicate that it is necessary to add diodes connecting certain of these decimal leads to certain of the matrix binary input leads 49, 51, 53, and 55 in order to prevent the appearance of erroneous signals on the conversion matrix output leads 57–61. These diodes all form AND gates with the respective leads to which they are connected to obtain the desired conversion operation. The diodes which respectively connect the decimal leads 202–206 to certain of the matrix input leads 49, 51, 53, and 55 are respectively diodes 255, 256 and 257; 258; 259 and 260; 261 and 262. Similar diodes 263 and 264 also connect decimal lead 208 to the matrix input leads 49 and 51, respectively.

Figure 3:
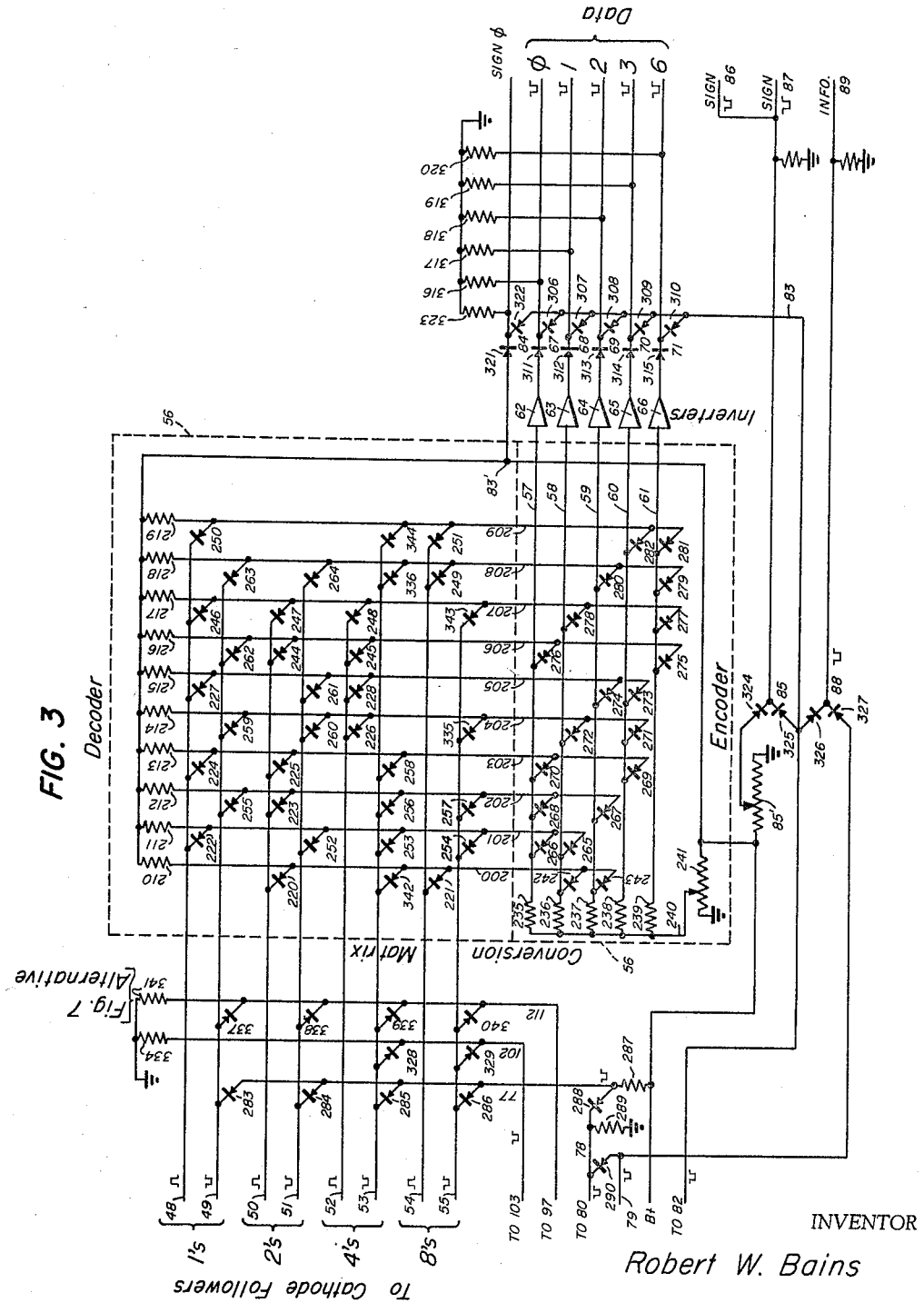
FIG. 3 is a schematic circuit diagram illustrating a major portion of the gating circuitry of the interpreter shown in FIG. 1, including the code converter and instruction producing gate circuits.

The encoder unit of the conversion matrix utilizes OR gates in order to encode the decimal digit signals which appear on the matrix decimal leads 200–209 in response to the sensing of corresponding decimal digits in the 1, 2, 4, 8 binary code by the sensing head 10. Each of these OR gates of the encoder unit includes two diodes similar to the diodes 242 and 243 connected to the decimal lead 200. Since the matrix output lead 58 represents the data digit 1, the decimal lead 201 is connected thereto by a diode 265 which conducts, as indicated in FIG. 3. The decimal signal 1, therefore, will provide a signal on only one of the leads of the five-channel output comprising the two-out-of-five code output leads of the matrix by this connection. It is necessary, therefore, to provide an additional signal on one of these output leads. Output lead 57 is provided in order to supply a data $\phi$ output lead which is utilized for carrying the second signal whenever a two-out-of-five lead is directly representative of a decimal digit. It is necessary, therefore, to connect a second diode between decimal lead 201 and output lead 57. This is provided by connecting a diode 266 which conducts in the direction shown in FIG. 3. For similar reasons, decimal lead 202 is connected by diodes 267 and 268 to the output leads 59 and 57 respectively. In the same manner, decimal lead 203 is connected by diodes 269 and 270 respectively to output leads 59 and 57 respectively, and decimal lead 203 is connected by diodes 269 and 270, respectively, to output leads 60 and 57.

In the $\phi$, 1, 2, 3, 6 two-out-of-five code the decimal digit 4 is represented by a combination of signals in the 1 and 3 channels. Decimal lead 204, which carries the decimal digit 4 signal is, therefore, connected directly by diodes 271 and 272, respectively, to output leads 60 and 58. Since this provides two output signals, the decimal lead 204 is not connected to the data $\phi$ output lead 57. Decimal lead 205 is connected by diodes 273 and 274, respectively, to output leads 60 and 59 for the same reasons as the connections of decimal lead 204 are made through its diodes to its output leads. Decimal lead 206 is connected directly by diode 275 to output lead 61 because a signal on this output lead represents the data decimal digit 6. In order to provide the required two signals on the output leads of the encoder unit, lead 206 also is connected by diode 276 to the data $\phi$ output lead 57. Decimal lead 207 is connected by diodes 277 and 278, respectively, to output leads 61 and 58 to provide signals on these leads representative of the data decimal digit 7. Similarly, lead 208 is connected by diodes 279 and 280, respectively, to output leads 61 and 60 to provide output signals representative of the data decimal digit 8. In like manner, decimal lead 209 is connected by diodes 281 and 282, respectively, to output leads 61 and 60, so as to provide output signals thereon representative of the data decimal digit 9.

*Control circuits*

The conversion matrix 56 will function in accordance with the binary coded decimal signals impressed upon its input leads to provide corresponding $\phi$, 1, 2, 3, 6 two-out-of-five signals on its output leads, all of which will be positive signals. The computer receptor component data terminals on which the interpreter output signals are to be impressed require that input signals thereto be negative signals. In order to provide such negative signals, inverters 62–66 are respectively connected to the conversion matrix output leads 57–61. These inverters may be of any suitable type and may include either tube or solid state circuitry. Suitably tube inverters are described in "Pulse and Digital Circuits," supra, pages 400–404, and suitable solid state inverters are disclosed in "Digital Modules," supra, pages 11 and 12.

As has been previously explained, it is not desirable to transmit signals to the computer receptor component input terminals at times when this component is not in condition to receive and process the signals. It is necessary, therefore, to provide for retention of the information in the interpreter until such time as the computer receptor component indicates that it is in condition to receive such additional information. This is indicated when the computer receptor component internal circuitry provides a request signal to the interpreter for additional information by impressing the OPERATION READ signal from the computer receptor component terminal 35 on the interpreter terminal 36. This OPERATION READ signal then is transmitted through line 79 to one of the inputs of the two-input AND gate 78. The other input of AND gate 78 is provided by the output of OR gate 77, which is a four-input gate which provides an output signal when it receives an input signal on any of its four inputs. As has been previously described with reference to FIG. 1, these four inputs to the OR gate 77 are provided from the binary leads 49, 51, 53, and 55 which are connected to the conversion matrix. Whenever a binary coded decimal signal is passed by the cathode followers to the conversion matrix, a negative signal appears on one or more of these binary leads and is, therefore, also impressed on the input of gate 77. The gate 77 performs as an OR gate by connecting the respective leads 49, 51, 53, and 55 through diodes 283, 284, 285, and 286 to a clamping resistor 287 which is connected on the other side from the diodes to the 235 volt D.C. regulated voltage B+. Thus, whenever a binary coded decimal signal is passed by a cathode follower 44–47 such that any one of the leads 49, 51, 53, or 55 is placed in its low state by a negative signal thereon, current will pass through the clamping resistor 287 and through one or more of the diodes 283–286 which is connected to the binary lead thus placed in its low state. In this manner, whenever a binary data signal is impressed on the conversion matrix input leads so as to produce a $\phi$, 1, 2, 3, 6 two-out-of-five signal on its output leads 57–61, a negative signal will be passed by the OR gate 77. This negative signal is impressed upon the AND gate 78 through a diode 288 and the AND gate 78 is clamped to ground by a resistor 289, such that whenever the diode 288 passes a negative signal as a result of the presence of a binary digital signal on any of the conversion matrix input leads, a negative signal will be passed by the gate 78 when it receives an OPERATION READ signal from the computer receptor component over line 79. This OPERATION READ signal is passed through the gate 78 by a suitable diode 290 and results in the impression of a negative signal on the one-shot multivibrator 80 input so as to trigger this multivibrator.

Figure 4:
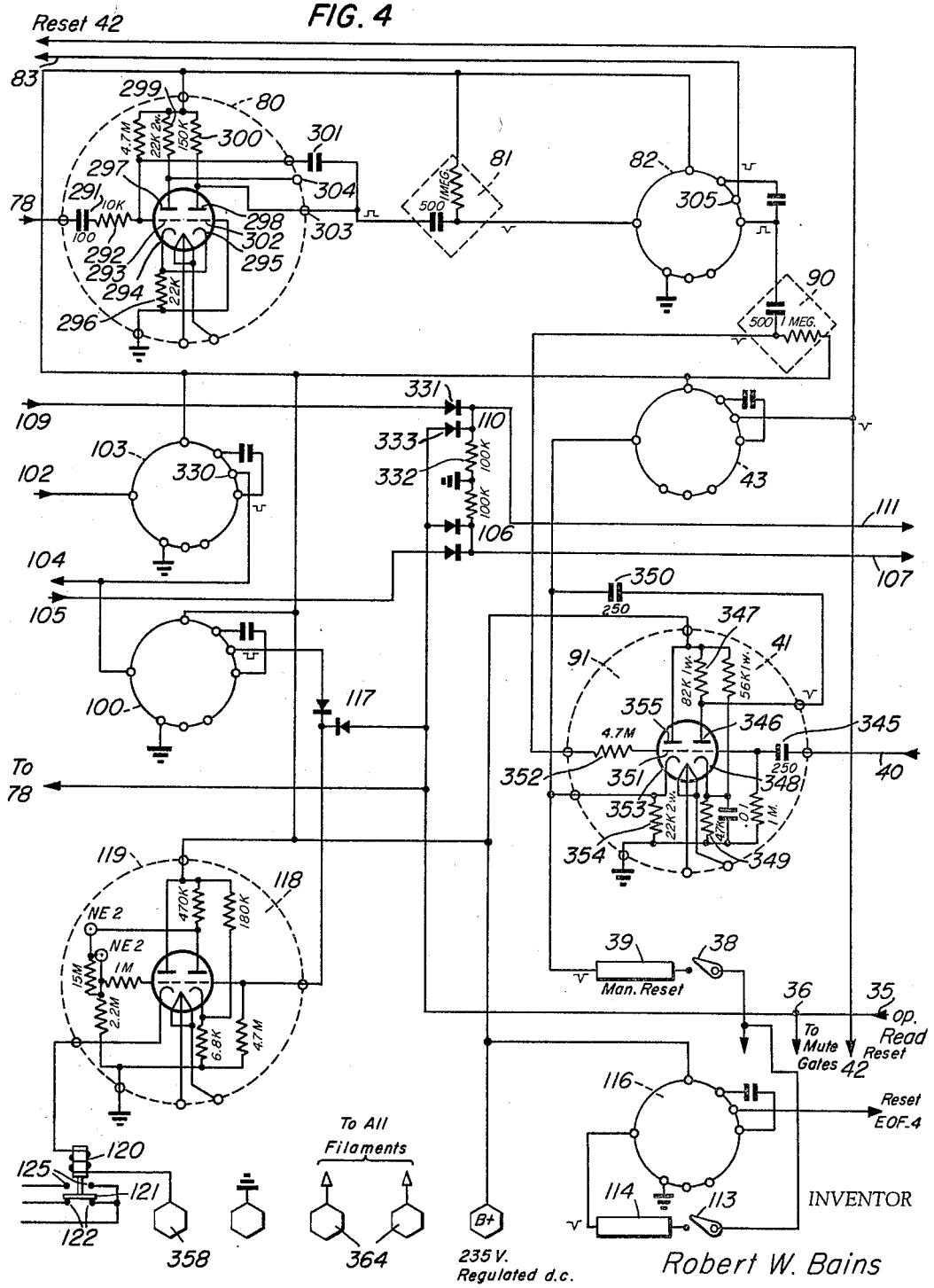
FIG. 4 is a schematic circuit diagram illustrating the basic circuit components and their interconnections comprising major elements for controlling and regulating the operation of interpreters, such as those shown in FIGS. 1 and 8.

The one-shot multivibrator 80 may be of any suitable type, such as those disclosed in detail in "Pulse and Digital Circuits," supra, pages 174–175, and pages 599–600, and in "Reference Data For Radio Engineers," supra, pages 468–469. Since a number of these multivibrators are used, only one need be considered in detail as illustrative of these units. FIG. 4 shows details of the one-shot multivibrator 80 with its several terminals, and the multivibrators 43, 82, 100, 103, and 116 may all be of the same or similar type. The values of the parts given in this figure are for illustrative purposes only and may be varied to provide the desired results in each case.

The one-shot multivibrator 80 is coupled to the output of the AND gate 78 by a suitable coupling condenser 291 and a parasitic suppressor resistance 292 connected to a control grid 293. Both cathodes 294 and 295 are grounded through a resistor 296, and the two plates 297 and 298 are respectively connected through plate loading resistances 299 and 300 to the 235 volt D.C. regulated voltage B+. The output plate 298 is coupled through a condenser 301 to the first grid 293 to supplement and reinforce the input signal. The second grid 302 is connected directly to ground. A positive pulse is provided on the terminal 303 connected the second plate 298 and a negative pulse on the terminal 304 of the first plate 297, so that such a multivibrator may be used to provide either or both of these types of signals.

As shown in FIG. 4, the positive ouput signal from the second plate terminal 303 is differentiated by the resistance-capacitance network differentiator 81 to provide a negative signal which is impressed on the first control grid of the one-shot multivibrator 82. The negative signal terminal 305 of this multivibrator is connected to line 83 and provides the second input to the various AND gates which control the input to the computer receptor component. Thus, when this negative signal is impressed on line 83, it provides the second input to the data AND gates 67–71 through diodes 306–310, respectively. The $\phi$, 1, 2, 3, 6 two-out-of-five coded data signal are applied respectively to diodes 311–315 of the gates 67–71, the outputs of which are connected to ground through clamping resistors 316–320, respectively.

As has previously been explained, the SIGN $\phi$ signal is provided by connecting one input of AND gate 84 to logical $\phi$ and the other input to the clock or triggering line 83. These two connections are respectively made through diodes 321 and 322 and the output of the gate is clamped to ground through a resistor 323. Since the computer receptor component requires three SIGN signals, the interpretor is arranged to provide two additional signals both of which are indicative of positive data, because all of the data recorded on the magnetic tape which is adapted to be read by the interpreter is positive data. As has been explained with reference to FIG. 1, these two additional SIGN signals can both be provided by a single AND gate 85. One input to this AND gate is permanently connected to logical 1 of the interpreter, that is, to a positive potential which may be somewhat less than the 235 volt regulated D.C. voltage B+. This may conveniently be obtained by a controllable potentiometer 85' to which the one input of the gate 85 is connected through a suitable diode 324. The other input of the gate 85 is connected to the clock or triggering line 83 through another suitable diode 325, so that a SIGN signal will appear on two terminals of the interpreter which carry the output signal of the AND gate 85 to the sign terminals 86 and 87 of the computer receptor component whenever the gate 85 receives a signal from line 83.

In addition to the SIGN signals the computer receptor component requires an INFORMATION signal as an instruction to the receptor component to instruct it that information data has been received on its data terminals. This INFORMATION signal is obtained from a two-input AND gate 88 which combines the two main control signals within the interpreter. One of these main control signals is the signal which is received from the one-shot multivibrator 82 which triggers all of the data AND gates and is applied through a suitable diode 326 to one of the inputs of the gate 88. The other input to the gate 88 is the OPERATION READ signal which is impressed on the interpreter terminal 36 by the computer receptor component from its terminal 35. This OPERATION READ signal is impressed on the gate 88 through another suitable diode 327, such that when both the OPERATION READ signal and the triggering signal from the one-shot multivibrator 82 are present, a negative INFORMATION signal is passed by the gate 88 and is impressed on the information terminal 89 of the computer receptor component.

*End-of-card and end-of-file signals circuitry*

As has been explained with reference to FIG. 1, at the end of each character, that is at the end of the complete sensing and interpretation of a character encoded in the magnetic tape which is being sensed by the read head 10 and the transmission of the interpreted data together with its associated instructions to the computer receptor component, an END-OF-CARD signal is adapted to be developed and transmitted to the computer receptor component to inform the computer circuitry that all of the information and instructions pertaining to that particular character have been entered into the computer circuit, and to inform the computer that it should proceed to process the information contained in the last character which it has thus received.

In accordance with the present invention, such an END-OF-CARD signal is developed from the simultaneous sensing of the 4 and an 8 in the 1, 2, 4, 8 binary coded decimal data. The sensing of these data bits by the read head 10 results in the development of binary signals through the 4's and 8's channels on the pairs of leads 52–53 and 54–55. This produces a positive signal on the binary leads 52 and 54 and a negative signal on the binary leads 53 and 55.

As shown in FIG. 3, the AND gate 102 is connected to the binary leads 53 and 55 by suitable diodes 328 and 329 so that the simultaneous occurrence of signals on these two diodes will pass a negative signal through the gate 102 to the one-shot multivibrator 103. This one-shot multivibrator may be of any suitable type similar to the multivibrator 80 shown in detail in FIG. 4. In this instance, the negative output pulse of the multivibrator which appears on its terminal 330 is passed to the terminal 104, FIG. 6, and impressed as one of the inputs to the OR gate 108. This results in the passage of a negative signal from the output of the OR gate 108 to its terminal 109 from which it passes through a suitable diode 331 as one of the inputs of the AND gate 110, FIG. 4. This gate 110 is clamped to ground through a suitable resistor 332. The other input to the AND gate 110 is the OPERATION READ signal which conditions the gate 110 through a suitable diode 333 to pass the END-OF-CARD signal when it occurs and transmit it to the end-of-card terminal 111 of the computer receptor component.

Whenever a complete record has been sensed by the interpreter read head 10 an END-OF-FILE signal is adapted to be produced and transmitted to the end-of-file terminal 107 of the computer receptor component so as to instruct the computer that all of the data in the file has been transmitted to it and that it should complete the computations which are to be made from the information which has been furnished by the interpreter regarding the file in question. As has been explained, this END-OF-FILE signal may be generated by the presence of 1, 2, 4 and 8 bits in the magnetic tape record or alternatively may be generated by a predetermined length of blank magnetic tape. A predetermined blank portion of the magnetic tape is sensed and produces an END-OF-FILE signal which is passed by the time delay element 99, FIG. 6, as a positive pulse and is subsequently differentiated by a suitable resistance-capacitance differentiator circuit of any suitable type, similar to those of differentiators 81 and 90, FIG. 4, to provide a negative signal which is impressed on one-shot multivibrators 97 and 98, these multivibrators producing negative signals on their negative output terminals. In each instance the multivibrators may be of any suitable type, such as that shown in FIG. 4 with reference to multivibrator 80.

The negative signal which passes from multivibrator 97 is impressed on terminal 105 from which it passes as one of the input signals to the two-input AND gate 106, FIG. 4. The other input of the AND gate 106 is the OPERATION READ signal which is impressed thereon from the interpreter terminal 36 by the computer receptor component terminal 35. When both of these signals are received by the AND gate 106 a negative END-OF-FILE signal is passed to the output of this gate and is impressed on the computer receptor component end-of-file terminal 107. In addition the one-shot multivibrator 98, FIG. 6, negative output signal is impressed as the second input to the two-input OR gate 108 and thereby passes as a negative signal to the terminal 109 from which it is impressed as one of the input signals on AND gate 110, FIG. 4. This AND gate 110 functions as has been previously explained to pass an END-OF-CARD signal to the computer receptor component end-of-card terminal 111. Thus, whenever the interpreter provides an END-OF-FILE signal to the computer receptor component, it also provides an END-OF-CARD signal. This is required in order to instruct the computer that the end of a character has been reached at the time that the sensing of a file or record has been completed. The computer requires such a signal as an instruction to it in order to have the computer process the information which it has received up to that point.

It must be noted that the diodes 328 and 329 of the AND gate 102 will permit current to flow therethrough and through a clamping resistor 334 to ground when a signal does not appear in either the 4's or 8's channel. When a signal appears in both of these channels, the binary leads 53 and 55 are in their low state and the binary leads 52 and 54 are in their high state. When this occurs, it places a high voltage on the diode 226 connected to decimal lead 204 and therefore inhibits the passage of current through this diode. This would tend to produce an erroneous output signal on the two-out-of-five outputs of the conversion matrix which would indicate the presence of a 4 as a data signal. It is necessary, therefore, to add a diode 335 which connects decimal lead 204 to the binary input lead 55 so that when a binary signal appears on the input leads 52 and 54 indicative of the end of a character, the decimal lead 204 will continue to carry current through the resistance 214 and the diode 335 to the lead 55, thereby maintaining the decimal lead 204 in its low state and inhibiting the appearance of an erroneous output signal on the two-out-of-five matrix output leads.

Similarly, when the matrix input leads 52 and 54 are placed in their high state by the presence of positive signals thereon, the decimal lead 208 will tend to rise to its high state because the voltage across the diode 249 connecting the decimal lead 208 to the matrix input lead 54 will cease conducting current therethrough. This would cause the appearance of an erroneous output signal on the two-out-of-five matrix output leads. It is therefore necessary to connect the decimal lead 208 through a diode 336 to the matrix input lead 53 so as to permit the flow of current through the diode 336 whereby the decimal lead 208 is maintained in its low state when an end of character representation is sensed by the read head 10.

As has been previously described, an alternative arrangement for indicating the end of a file or record may be provided by utilizing a bit in each of the four channels of the magnetic tape. When this is done, sensing of this end-of-file record by the interpreter read head 10 will produce binary signals on all of the binary leads 48–55. Since the binary leads 49, 51, 53, and 55 are respectively connected to terminals 93, 94, 95, and 96 to which the four inputs of the four-input AND gate 112 are connected, such signals on the binary leads will cause the AND gate to pass a negative signal which will be impressed as a triggering signal on the one-shot multivibrator 97. This multivibrator may be of any suitable type similar to the multivibrator 80, which is shown in detail in FIG. 4. The AND gate 112, which passes this triggering signal, is formed by connecting the binary leads 49, 51, 53, and 55 through diodes 337, 338, 339, and 340, respectively, to a common junction which is clamped to ground by a suitable resistance 341.

When this alternative arrangement is used for producing an END-OF-FILE signal, the matrix binary input leads 48, 50, and 54 are placed in their high state due to an appearance of a positive signal thereon. Since the matrix decimal lead 200 is connected to the matrix binary input leads 50 and 54 through diodes 220 and 221, respectively, both of these diodes will cease conducting under these conditions, and the decimal lead 200 will tend to be placed in a high state, so that it would give an erroneous signal on the two-out-of-five matrix output leads. This erroneous condition is prevented by connecting the decimal lead 200 through a suitable diode 342 to the matrix binary input lead 53, since this lead is placed in its low or conducting state when this END-OF-FILE signal condition occurs. This diode 342 will, therefore, conduct current through the clamping resistor 210, and the voltage drop across this resistor will hold the decimal lead 200 in its low state, thereby inhibiting the appearance of an erroneous signal on the conversion matrix two-out-of-five output leads.

Similarly, decimal lead 207 will tend to be placed in its high state on the occurrence of an END-OF-FILE signal on all of the binary leads, as such signals will cut off the passage of current through the diodes 246, 247, and 248 which connect the decimal lead 207 to the binary leads 48, 50, and 52, respectively. A diode 343 is, therefore, provided which connects the decimal lead 207 to the matrix binary input lead 55, such that when an END-OF-FILE signal appears on all of the matrix binary input leads, current will flow through the diode 343, the decimal lead 207, and the clamping resistor 217. This current flow will cause a voltage drop across the resistor 217 and will maintain the decimal lead 207 in its low state, thereby inhibiting the appearance of an erroneous signal on the conversion matrix two-out-of-five output leads connected to decimal lead 207.

In like manner, the appearance of an END-OF-FILE signal on all of the matrix binary input leads will cut off the passage of current through the diodes 250 and 251 which connect the decimal lead 209 to the matrix input leads 48 and 54. This tends to place the decimal lead 209 in its high state and would tend to produce erroneous output signals in the conversion matrix two-out-of-five code output leads. In order to prevent such erroneous signals, a diode 344 connects the decimal lead 209 to the matrix binary input lead 53, such that when the END-OF-FILE signal appears on the binary leads, current will flow through the binary lead 53, the diode 344, the decimal lead 209, and the decimal lead clamping resistor 219. This flow of current will cause a voltage drop across the resistor 219 and maintain the decimal lead 209 in its low state, thereby inhibiting the appearance of erroneous signals on the matrix two-out-of-give code output leads which are connected to the decimal lead 209. Thus, it will be seen that when the END-OF-FILE signal utilizes a bit in all of the four channels of a 1, 2, 4, 8 binary coded decimal code, it is necessary to add three additional diodes to the conversion matrix in order to prevent erroneous signals on its output leads.

FIG. 4 illustrates the interconnections of the various one-shot multivibrators, pulse generators, differentiators, and inverters which are used in producing the desired control signals in the interpreter. The functioning of the interconnections of these units has been previously explained with reference to FIG. 1. All of the one-shot multivibrators may be of the same type as that described in detail with reference to the multivibrator 80 as illustrated in FIG. 4. The inverter 41 and the buffer 91 may form two parts of a conventional 5963 tube, with suitable coupling and biasing resistors and condensers. The inverter illustrated is of the type described in detail in "Pulse and Digital Circuits," supra, pages 400–404, and utilizes a condenser 345 for coupling the inverter to the computer receptor component reset terminal 40. The inverter plate 346 is connected to the 235 volt regulated D.C. voltage B+ through a loading resistor 347, and the inverter cathode 348 is connected to ground through a resistor 349. The plate 346 provides the output of the inverter, which is coupled to the reset line 42 through a coupling condenser 350. Any other suitable conventional type of inverter can be used to provide the same results of inverting the positive computer reset pulse and impressing it as a negative signal on the reset line 42.

The buffer 91 may utilize the other half of the 3963 tube, part of which is used as the inverter 41. In this connection, the grid 351 of the tube is connected to the output of the differentiator 90 through a parasitic suppression resistor 352, and the cathode 353 is connected to ground through a resistor 354. The plate 355 is connected directly to the 235 volt D.C. regulated voltage B+, and the cathode 353 is directly connected to the one-shot multivibrator 43 to provide for passage of the normal resetting signal to the binaries 31–34.

The relay driver 119 may also comprise a 5963 tube which is suitably biased by resistance and connected to the two-input OR gate 117 by the inverter 118. This inverter 118 is essentially the same as the inverter 41 and is used to impress a positive signal on the relay driver so that it will draw current through its cathode 156 and thereby energize the relay coil so as to provide for the desired operation of the tape transport, as has been previously explained with reference to FIG. 1.

*Power supply*

Figure 5:
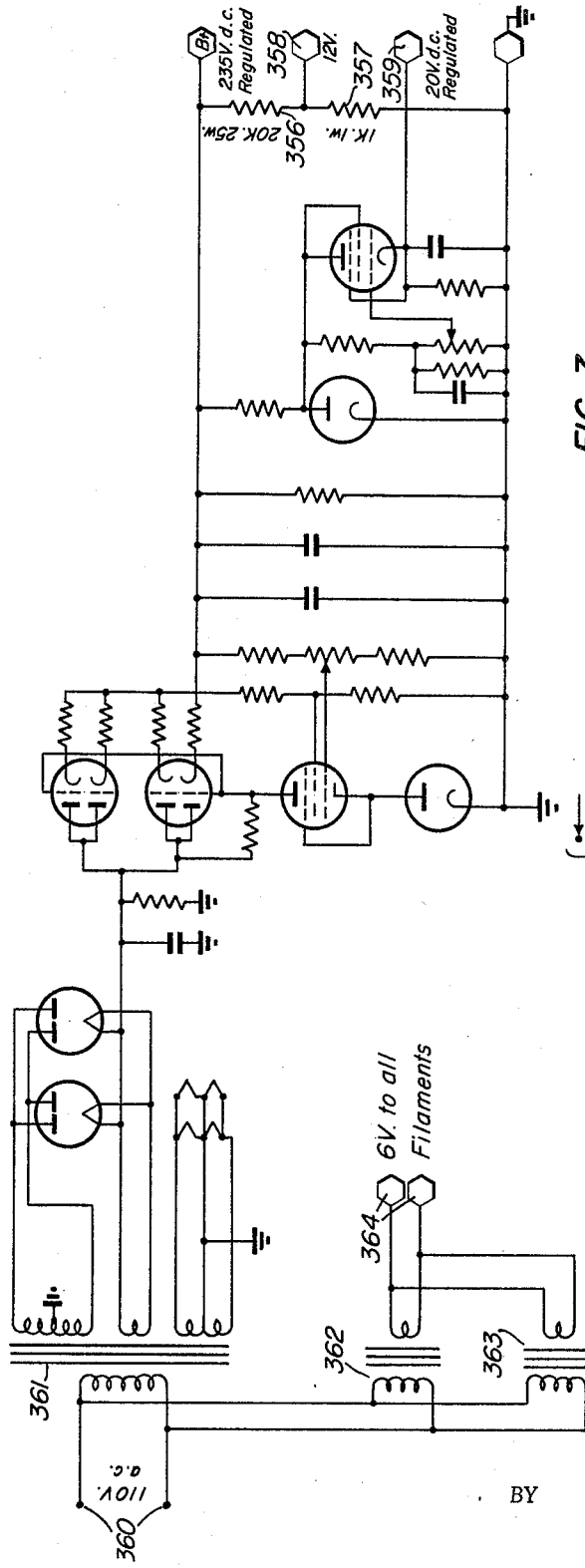
FIG. 5 is a schematic circuit diagram illustrating a power supply circuit adapted for use with interpreters of the type shown in FIGS. 1 and 8.

The entire interpreter is adapted to be energized by a suitable source of power supply, such as that illustrated in FIG. 5. In this arrangement, a 235 volt D.C. regulated voltage B+ is derived across a voltage divider resistance network comprising resistors 356 and 357 arranged between the terminals B+ and ground. An intermediate terminal 358 is provided which is adapted to be used to energize the relay coil 120 connected to the cathode of the relay driver 119. This voltage preferably is about 12 volts, as indicated in the diagram. The power circuit which is illustrated comprises suitable voltage dividers, condensers, biasing resistors, and tubes of specific values, as shown in FIG. 5; however, these values are provided for illustrative purposes only. The ouput of the system is regulated so as to maintain substantially constant the voltages as indicated on the terminals B+, 358, and 359. Power is supplied to this system from a conventional 110 volt A.C. source connected to the terminals 360 of a suitable transformer 361. Auxiliary transformers 362 and 363 preferably are provided connected in parallel across terminals 364 and energized by the 110 volt A.C. source so as to provide a substantially constant 6-volt A.C. source for energizing the filaments of all of the tubes used in the interpreter. The various filaments of the tubes are not shown connected to this 6-volt A.C. source, as this would needlessly complicate the various diagrams of the system.

*Apparatus for interpreting 1, 2, 3, 6 binary coded decimal data into $\phi$, 1, 2, 3, 6 two-out-of-five coded data*

FIGS. 8, 9, 10 and 11 illustrate a second embodiment of the present invention wherein an interpreter is provided which is adapted to convert four-channel 1, 2, 3, 6 binary coded decimal data into five-channel $\phi$, 1, 2, 3, 6 two-out-of-five data. The general operation of the major elements of this second embodiment is essentially the same and comprises substantially the same units as those of the first embodiment. Power for the interpreter may be supplied by a power source such as that shown in FIG. 5. The four-channel 1, 2, 3, 6 binary coded decimal data is sensed, amplified, transmitted, and applied to four pairs of binary output leads 48′ through 55′, which correspond to the binary output leads 48 through 55 in the first embodiment. The details of the system included in this portion of the second embodiment of the interpreter may comprise the same units, connected in the same manner as those in the first embodiment, which are described in detail with reference to one channel of the system, as illustrated in FIG. 2. In addition, the tape transport and its control may comprise the same units as those of the FIG. 1 embodiment. Likewise, the various control elements for providing the triggering signal on the line 83 to the various information AND gates and the resetting circuitry are substantially the same as those shown in the first embodiment and, therefore, will not be described in detail. The reference numerals applied in FIG. 8, which are the same as those appearing on corresponding parts in FIG. 1, refer to the same parts connected in the same manner as in FIG. 1 for obtaining the same operation.

*Code conversion gating*

Figure 8:
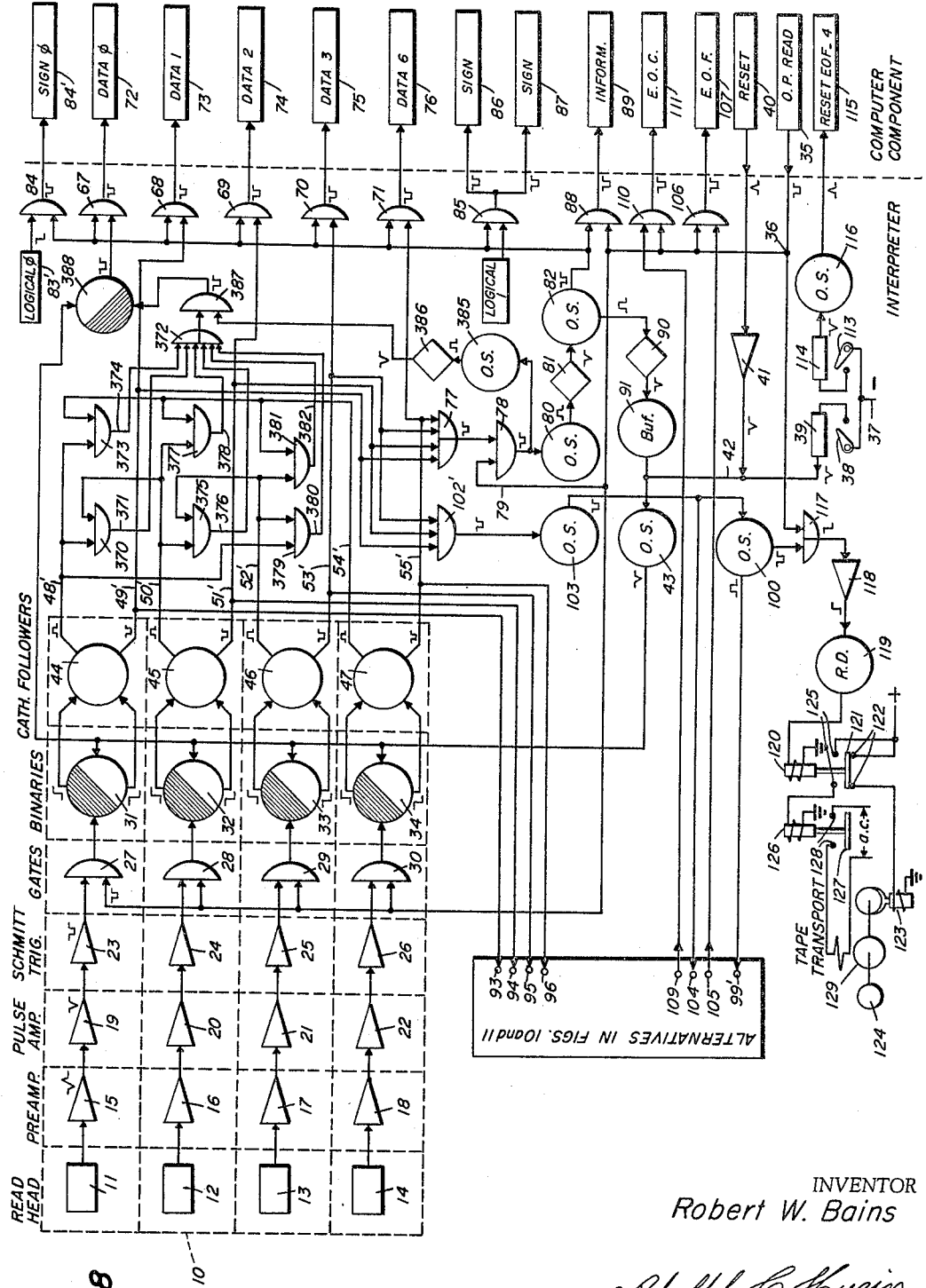
FIG. 8 is a logic diagram illustrating another embodiment of the present invention for converting a four-channel binary coded decimal code, such as 1, 2, 3, 6 binary coded decimal code, into a two-out-of-five code, such as a $\phi$, 1, 2, 3, 6 two-out-of-five code.

In the present embodiment, the binary coded decimal digit 1 will provide a negative signal on the binary output lead 49′ and, therefore, this lead is connected directly as one of the inputs to the two-input AND gate 68. In like manner, the binary coded decimal digit 2 provides a negative signal on the binary output lead 51′, so that this lead can be connected directly as one of the inputs to the two-input AND gate 69. In the same manner, the binary coded decimal digit 3 provides a negative signal on the binary output lead 53′, so that this lead may be connected directly as one of the inputs to the two-input AND gate 70. Also, the binary coded decimal digit 6 impresses a negative signal on the binary output lead 55′, so that this lead can be connected directly as one of the inputs to the two-input AND gate 71. In order to provide a second signal for the digits 1, 2, 3 and 6, it is necessary that a data $\phi$ signal be provided on the occurrence of such signals in the data which is sensed by the read head 10 in the magnetic tape encoded with 1, 2, 3, 6 binary coded decimal data. This is obtained by combining in two-input AND gates the positive signals which are produced by each decimal digit which requires a combination of two of the digits 1, 2, 3 and 6. These gates are shown in FIGS. 8 and 9, wherein gate 370 combines the positive signals representing the digit 1 from lead 48′ and the digit 2 from lead 50′ to produce an output which is applied through lead 371 as one input of a six-input OR gate 372. Similarly, a two-input AND gate 373 combines a positive signal representing the digit 1 on the lead 48′ with a positive signal from the lead 54′ representing the digit 6 to produce an output signal impressed on lead 374 and forming another input to the six-input OR gate 372. In like manner, a positive signal representing the digit 2 on binary output lead 50′ is combined as an input to a two-input AND gate 375 with a positive signal representing the digit 3 on the binary output lead 52′ to provide an output signal on its output lead 376 which is connected so as to form a third input to the six-input OR gate 372. A fourth AND gate 377 is arranged with one of its inputs connected to the binary output lead 50′, so as to receive a positive signal therefrom representing a digit 2 and has the other input thereof connected to the binary output lead 54′ to receive a positive signal thereon representing the digit 6, whereby an output signal appears on the output lead 378 and is impressed as a fourth input to the six-input OR gate 372. A fifth two-input AND gate 379 is provided with one of its inputs connected to the binary output lead 48′ to receive a positive signal therefrom representing the digit 1 and having its other input connected to the binary output lead 52′ to receive a positive signal on its output lead 380 which is impressed as the fifth input on the six-input OR gate 372. A sixth two-input AND gate 381 is provided with one of its inputs connected to the binary output lead 52' so as to receive a positive signal therefrom representing the digit 3 and with its other input connected to the binary output lead 54' to receive a positive signal therefrom representing the digit 6. When both of these inputs receive signals, the AND gate 381 passes an output signal to its output lead 382 which is impressed as the sixth input on the six-input OR gate 372. Thus, on the occurrence of any of these six combinations of signals on the binary output leads in the four input channels of the interpreter, the six-input OR gate 372 will provide a positive signal output.

As in the embodiment of this invention illustrated in FIG. 1, the binary output leads 49', 51', 53' and 55' are connected as the four inputs to the four-input OR gate 77, so as to provide a negative output signal therefrom on the occurrence of a binary digit signal in any of the four input channels of the interpreter. This output is fed as one of two inputs to the two-input AND gate 78, the other input of which is connected by the line 79 to the interpreter terminal 36 so as to receive the OPERATION READ signal from the computer receptor component. When both of the inputs are present on AND gate 78 a negative output signal passes therefrom and in this embodiment forms the triggering input to a one-shot multivibrator 385. The positive output terminal of this one-shot multivibrator is connected to a suitable differentiator 386 so as to provide a negative signal output which is impressed as the second input to a two-input AND gate 387. The other input to the AND gate 387 is the output of the six-input OR gate 372. This AND gate 387 therefore can only have a negative signal output when a digit 1, 2, 3 or 6 is sensed by the read head 10 in this embodiment, as the sensing of any other binary coded decimal digit will produce a positive output from the OR gate 372 which will inhibit the passage of a signal through the AND gate 387. The output of the AND gate 387 is connected as the triggering input to a binary 388 connected so that this binary will produce a negative output signal on the occurrence of a negative output signal from the AND gate 387. This negative output signal from the binary 388 is impressed as one of the inputs to the two-input AND gate 67. The remainder of the information and instruction or control signals are developed by this embodiment in substantially the same manner as in the embodiment illustrated in FIGS. 1–7 and provide the desired inputs to the computer receptor component. Details of the circuitry used in this embodiment which are different from those of the first embodiment are illustrated in FIGS. 9, 10, and 11.

While particular embodiments of this invention have been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A data processing apparatus comprising: means for sensing a four-channel binary coded decimal data record and providing binary coded decimal signals representing data sensed thereby, an interpreter comprising means connected for receiving and decoding such binary coded signals into decimal output signals representing decimal values of binary coded decimal data sensed, means connected for receiving and encoding such decimal signals into five-channel two-out-of-five coded data output signals, means responsive to a request signal from an outside data receiving apparatus for operating and controlling said means for sensing a data record and providing said binary coded decimal signals, and other means responsive to said request signal for controlling the transmittal of the two-out-of-five coded data signals.

2. A data processing apparatus comprising: means for sensing a four-channel binary coded decimal data record and providing binary coded decimal signals representing data sensed thereby, an interpreter comprising means connected for receiving and decoding such binary coded decimal signals into decimal output signals representing decimal values of binary coded decimal data sensed, means connected for receiving and encoding such decimal signals into five-channel two-out-of-five coded data output signals, means responsive to a request signal from an outside data receiving apparatus for operating and controlling said means for sensing a data record and providing said binary coded decimal signals, and other means responsive to said request signal and to said binary coded decimal signals for providing a predetermined delayed control of the transmittal of the two-out-of-five coded data signals.

3. A data processing apparatus comprising: means for sensing a four-channel binary coded decimal data record and providing signals representing data sensed thereby, binary means connected to receive said data signals and providing binary coded decimal signals representative thereof, an interpreter comprising means connected for receiving and decoding such binary coded decimal signals into 10-channel data decimal output signals representing decimal values of binary coded decimal data sensed, means connected for receiving and encoding such decimal signals into two-out-of-five coded data output signals, means responsive to a request signal from an outside data receiving apparatus for operating and controlling said means for sensing a data record and said means providing said binary coded decimal signals, other means responsive to said request signal and to said binary coded decimal signals for providing a predetermined delayed control of the transmittal of the two-out-of-five coded data signals, and means connecting said binary means to said other means for response thereto for resetting said binary means to an initial sensed data signal receiving condition.

4. An electronic data processing apparatus for interpreting 1, 2, 4, 8 binary coded decimal data into $\phi$, 1, 2, 3, 6 two-out-of-five coded data comprising: a four-channel sensing means for emitting separate signals representing data sensed in each channel, a separate means for amplifying data signals in each channel, separate binaries each respectively connected to receive data signals in a different one of said channels and each providing two outputs indicative of the presence or absence of data in the respective channel, a matrix having input leads connected to said binary outputs and output leads with diodes forming AND gates connecting said matrix input to certain of said output leads for converting the 1, 2, 4, 8 binary coded decimal data outputs of said binaries into decimal data outputs on said output leads, and a second matrix having input leads connected to said AND matrix decimal data output leads and having output leads with diodes forming OR gates connecting said second matrix input and output leads for converting decimal data outputs into $\phi$, 1, 2, 3, 6 two-out-of-five coded data outputs.

5. An electronic data processing apparatus for interpreting four-channel binary coded decimal data into two-out-of-five coded data comprising: means for sensing four channels and emitting signals representing data sensed in each of four input channels, a separate binary means connected to receive data signals in each channel and providing two outputs indicative of the data in each respective channel, an AND gate matrix having input leads connected to said binary means and decimal data leads with diodes connected to certain of said input leads in such manner as to decode the sensed four-channel binary coded decimal data outputs of said binary means into decimal data outputs on said decimal data leads, and an OR gate matrix having input leads connected to said AND matrix decimal data leads and having output leads with diodes connected to certain of said OR gate matrix input leads in such manner as to encode the decimal data outputs into two-out-of-five coded data outputs.

6. An electronic data processing apparatus for interpreting four-channel binary coded decimal data into five-channel two-out-of-five coded data comprising: means for sensing a four-channel record and providing signals representing data sensed in each of four record channels, means for receiving an operating signal for controlling the sensing of the record and the providing of sensed data signals, means connected to receive the sensed data signals and to provide four pairs of respective binary coded decimal data output signals, means including a gating system for converting the four pairs of binary data output signals into five-channel two-out-of-five coded data outputs, means including five two-input AND gates each having one input connected respectively to receive a separate one of said five-channel coded data outputs, means responsive to said binary data output signals and to said operating signal for providing a predetermined delayed INFORMATION signal, means for supplying said INFORMATION signal to the other input of each of said five AND gates for controlling the output thereof, means for resetting said binary output signal providing means to an initial sensed data receiving condition, and means responsive to said INFORMATION signal for providing a plurality of predetermined sign signal outputs.

7. An electronic data processing apparatus for interpreting four-channel binary coded decimal data into five-channel two-out-of-five coded data comprising: means for sensing a four-channel record and providing signals representing data sensed in each of four record channels, means for receiving an operating signal for controlling the sensing of a record and the providing of sensed data signals, means connected to receive the sensed data signals and to provide four pairs of respective binary coded decimal data output signals, means including a gating system for converting the four pairs of binary data output signals into five-channel two-out-of-five coded data outputs, means including five two-input AND gates each having one input connected respectively to receive a separate one of said five-channel coded data outputs, means responsive to said binary data output signals and to said operating signal for providing a predetermined delayed INFORMATION signal, means for supplying said INFORMATION signal to the other input of each of said five AND gates for controlling the output thereof, means responsive to a predetermined condition of said four binary data output signals for providing an END-OF-CARD signal, means responsive to another predetermined condition of said four binary data output signals for providing an END-OF-FILE and an END-OF-CARD signal, and means for resetting said binary output signal providing means to an initial sensed data receiving condition.

8. An electronic data processing apparatus for interpreting a four-channel record code into a five-channel two-out-of-five record code and producing certain control signals comprising: a four-channel read head, separate amplifying means for each channel of said read head, separate means respectively connected to each amplifying means for shaping pulses received therefrom, separate AND gates respectively connected to receive record pulses from each pulse shaping means and to receive a READ signal from a record receiving data processing equipment for emitting a respective record signal upon the presence of both a record pulse and the READ signal, separate binaries respectively connected to receive record signals from each AND gate, means for concurrently resetting said binaries, gates connected to the outputs of said binaries for emitting respective signals in the two-out-of-five record code, means responsive to the READ signal from the record receiving data processing equipment and to the presence of information record output from any of said binaries for emitting an INFORMATION signal, separate AND gates each connected respectively to receive signals from a separate one of said two-out-of-five record channels and to receive the INFORMATION signal for respectively emitting a corresponding two-out-of-five record data signal, means responsive to a predetermined record condition of the four-channel record for emitting an END-OF-CARD signal, means responsive to another predetermined record condition of the four-channel record for emitting an END-OF-FILE and an END-OF-CARD signal, means including an OR gate responsive to either an END-OF-CARD or an END-OF-FILE signal for inhibiting the transmittal of the INFORMATION signal, and a pair of AND gates connected one to receive said END-OF-CARD signal and the other to receive said END-OF-FILE signal and both connected to receive said READ signal for respectively emitting an output END-OF-CARD and END-OF-FILE signal in the presence of both respective signals on the respective gate.

9. An electronic data processing apparatus for interpreting 1, 2, 4, 8 binary coded decimal data into $\phi$, 1, 2, 3, 6 two-out-of-five coded data and certain control signals comprising: a four-channel read head, separate AND gates connected to receive data pulses in each respective channel and to receive a READ signal from a data receiving and processing equipment for emitting an output data signal upon the presence of both a data pulse and the READ signal, separate binaries each respectively connected to receive said output data signals from a different one of said AND gates and each providing two outputs indicative of the presence or absence of said output data signals in the respective channel, means for concurrently resetting said binaries, a matrix having input leads connected to said binary outputs and output leads with diodes connecting certain of said matrix input leads to said certain output leads for converting the 1, 2, 4, 8 binary coded decimal data outputs of said binaries into decimal data outputs on said output leads, and a second matrix having input leads each respectively connected to different of said decimal output leads and having output leads with diodes connecting each of said second matrix input leads to certain of said second matrix output leads for converting decimal data into $\phi$, 1, 2, 3, 6 two-out-of-five coded data outputs, means responsive to said READ signal and to the presence of a data output from any of said binaries for emitting an INFORMATION signal, separate AND gates each connected respectively to receive signals from a separate one of said two-out-of-five data outputs and to receive the INFORMATION signal for respectively emitting a corresponding $\phi$, 1, 2, 3, 6 two-out-of-five data signal, means responsive to a predetermined data condition of the four-channel 1, 2, 4, 8 binary coded decimal data for emitting an END-OF-CARD signal, means responsive to another predetermined data condition of the four-channel 1, 2, 4, 8 binary coded decimal data for emitting an END-OF-FILE and an END-OF-CARD signal, and means including an OR gate responsive to either an END-OF-CARD or an END-OF-FILE signal for inhibiting the transmittal of the INFORMATION signal.

10. An electronic data processing apparatus for interpreting 1, 2, 4, 8 binary coded decimal data into $\phi$, 1, 2, 3, 6 two-out-of-five coded data and certain control signals comprising: a four channel read head, a plurality of AND gates connected to receive data pulses in each respective channel and to receive a READ signal from a data receiving and processing equipment for emitting an output data signal upon the presence of both a data pulse and the READ signal, separate binaries each respectively connected to receive said output data signals from a different one of said AND gates and each providing two outputs indicative of the presence or absence of said output data signals in each respective channel, means for concurrently resetting said binaries, a matrix having input leads connected to said binary outputs and output leads with diodes forming AND gates connecting said matrix input leads to said output leads for converting the 1, 2, 4, 8 binary coded decimal data outputs of said binaries into decimal data outputs on said output leads, a second matrix having input leads connected to said AND matrix decimal data output leads and having output leads with diodes forming OR gates connecting said second matrix input leads to said second matrix output leads for converting decimal data outputs into $\phi$, 1, 2, 3, 6 two-out-of-five coded data outputs, means responsive to the READ signal from the data receiving and processing equipment and to the presence of a data output from any of said binaries for emitting an INFORMATION signal, separate AND gates each connected respectively to receive signals from a separate one of said $\phi$, 1, 2, 3, 6 two-out-of-five data outputs and to receive the INFORMATION signal for respectively emitting a corresponding $\phi$, 1, 2, 3, 6 two-out-of-five data signal, means responsive to a predetermined data condition of the four-channel 1, 2, 4, 8 binary coded decimal data for emitting an END-OF-CARD signal, means responsive to another predetermined data condition of the four-channel 1, 2, 4 8 binary coded decimal data for emitting an END-OF-FILE and an END-OF-CARD signal, means including an OR gate responsive to either an END-OF-CARD or an END-OF-FILE signal for inhibiting the transmittal of the INFORMATION SIGNAL, and a pair of separate AND gates connected one to receive said END-OF-CARD signal and the other to receive said END-OF-FILE signal and both connected to receive said READ signal for respectively emitting an output END-OF-CARD and END-OF-FILE signal in the presence of both respective signals on the respective gate.

11. A diode matrix for converting 1, 2, 4, 8 binary coded decimal data into $\phi$, 1, 2, 3, 6 two-out-of-five coded data comprising: four pairs of input leads for connection to the outputs of four binaries respectively each providing two outputs indicative of the presence or absence of coded data supplied thereto, decimal leads with diodes connected to certain of said input leads for converting the 1, 2, 4, 8 binary coded decimal outputs into decimal data outputs on said decimal leads, and output leads with diodes connected to certain of said decimal leads for converting decimal data outputs into $\phi$, 1, 2, 3, 6 two-out-of-five coded data on said output leads.

12. A diode matrix for converting a four-channel binary coded decimal input data into a five-channel two-out-of-five coded data output comprising: a decoding matrix having four pairs of binary inputs and ten decimal digit leads with diodes connecting certain of said inputs to said decimal leads in the form of a decoder converting said four-channel binary coded decimal code input into decimal digits on said ten decimal digit leads, and an encoding matrix having five outputs with diodes connecting said decimal digit leads to certain of said five outputs in the form of an encoder converting decimal digits into corresponding two-out-of-five code on said five outputs.

13. A diode matrix for converting four-channel 1, 2, 4, 8 binary coded decimal input data into $\phi$, 1, 2, 3, 6 two-out-of-five coded data comprising: a decoding matrix having four pairs of binary inputs and ten decimal digit leads with diodes connecting together certain of said inputs and said decimal digit leads in the form of a decoder converting said 1, 2, 4, 8 binary coded decimal code input into corresponding decimal digits on said ten decimal digit leads, and an encoding matrix having five outputs with diodes connecting together said decimal digit leads and said five outputs in the form of an encoder converting decimal digits into corresponding $\phi$, 1, 2, 3, 6 two-out-of-five code on said five outputs.

14. A matrix for converting a four-channel binary coded decimal code input into a two-out-of-five code output comprising: four pairs of binary inputs, five two-input AND gates each having an output, means connecting one input of each of four of said five AND gates respectively to a separate corresponding binary input of each of said four pairs of binary inputs, six two-input AND gates each having an output, means connecting the two inputs of each of said six AND gates respectively to different combinations of two binary inputs other than the inputs connected to said four AND gates, an OR gate with an output and with inputs connected to the output of each of said six AND gates, means for providing an INFORMATION control signal, means connecting said latter means to an input of each of said five AND gates for controlling the output thereof, means including a two-input AND gate having one input connected to the output of said OR gate and the other input connected to receive an input opposite in sense to the output of said OR gate on occurrence of any binary input coded digit not producing an output by said OR gate, and means connecting the output of said latter AND gate to the remaining input of the fifth of said five AND gates not connected directly to said four binary inputs.

References Cited by the Examiner

UNITED STATES PATENTS 2,872,666 2/1959 Greenhalgh _____ 340—174
3,199,099 8/1965 Nassimbene _____ 340—347

OTHER REFERENCES

Thompson, P. M.: IBM Technical Disclosure Bulletin volume 2, No. 2, August 1959 (pp. 17–18 relied on).

ROBERT C. BAILEY, *Primary Examiner.*

R. B. ZACHE, *Assistant Examiner.*